US008964713B2

(12) United States Patent
Hinohara et al.

(10) Patent No.: US 8,964,713 B2
(45) Date of Patent: Feb. 24, 2015

(54) TRANSMISSION MANAGEMENT SYSTEM, TRANSMISSION SYSTEM, TRANSMISSION MANAGEMENT METHOD, TRANSMISSION MANAGEMENT PROGRAM, COMPUTER READABLE INFORMATION RECORDING MEDIUM, PROGRAM PROVIDING SYSTEM, AND MAINTENANCE SYSTEM

(75) Inventors: Hiroshi Hinohara, Kanagawa (JP); Takahiro Asai, Kanagawa (JP); Kunio Okita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 19 days.

(21) Appl. No.: 13/880,822

(22) PCT Filed: Oct. 17, 2011

(86) PCT No.: PCT/JP2011/074370
§ 371 (c)(1),
(2), (4) Date: Apr. 22, 2013

(87) PCT Pub. No.: WO2012/053651
PCT Pub. Date: Apr. 26, 2012

(65) Prior Publication Data
US 2013/0222528 A1 Aug. 29, 2013

(30) Foreign Application Priority Data

Oct. 22, 2010 (JP) ................................. 2010-237672
Aug. 9, 2011 (JP) ................................. 2011-173751

(51) Int. Cl.
*H04W 4/00* (2009.01)
*H04N 7/15* (2006.01)
*H04L 12/18* (2006.01)
*H04M 3/56* (2006.01)
*H04L 12/26* (2006.01)

(52) U.S. Cl.
CPC .............. *H04N 7/15* (2013.01); *H04L 12/1827* (2013.01); *H04M 3/567* (2013.01); *H04L 43/0852* (2013.01)

USPC ......................................................... 370/338

(58) Field of Classification Search
CPC ....... H04N 7/147; H04N 7/142; H04N 7/165; H04M 3/567; H04M 15/752; H04L 65/1073; H04L 67/303
USPC ............................... 348/14.07–14.09; 726/24
See application file for complete search history.

(56) References Cited

U.S. PATENT DOCUMENTS 6,272,338 B1 * 8/2001 Modzelesky et al. ......... 455/430

(Continued)

FOREIGN PATENT DOCUMENTS

JP 2003-069563 3/2003
JP 2008-227577 9/2008

OTHER PUBLICATIONS

International Search Report Issued Nov. 29, 2011 in PCT/JP2011/074370 filed on Oct. 17, 2011.

*Primary Examiner* — Mohammad Islam
(74) *Attorney, Agent, or Firm* — Oblon, Spivak, McClelland, Maier & Neustadt, L.L.P.

(57) ABSTRACT

A transmission management system manages, for items of transmission terminal identification information for identifying transmission terminals, respectively, relay apparatus identification information for identifying relay apparatuses capable of relaying content data transmitted from each of transmission terminals; receives, from the transmission terminal acting as a request source, items of the terminal identification information for identifying the transmission terminal acting as the request source and the transmission terminal acting as a destination, respectively; searches the relay apparatus identification information based on the received items of the terminal identification information for identifying the transmission terminals acting as the request source and the destination, respectively, and extracts items of the relay apparatus identification information each being common to the items of the transmission terminal acting as the request source and the destination, respectively.

7 Claims, 24 Drawing Sheets

(56) References Cited

U.S. PATENT DOCUMENTS

| | | | |
|---|---|---|---|
| 7,850,479 B2* | 12/2010 | Shigemi et al. | 439/374 |
| 8,305,909 B2* | 11/2012 | Ishii et al. | 370/244 |
| 8,340,061 B2* | 12/2012 | Yao et al. | 370/338 |
| 2001/0012775 A1* | 8/2001 | Modzelesky et al. | 455/427 |
| 2008/0168563 A1* | 7/2008 | Ito et al. | 726/24 |
| 2012/0140022 A1* | 6/2012 | Kato et al. | 348/14.08 |
| 2013/0227425 A1* | 8/2013 | Kim et al. | 715/740 |
| 2013/0242030 A1* | 9/2013 | Kato et al. | 348/14.07 |

\* cited by examiner

FIG.10

CHANGE QUALITY MANAGEMENT TABLE

| IP ADDRESS OF RELAY DESTINATION TERMINAL | IMAGE QUALITY (QUALITY OF IMAGE) OF IMAGE DATA TO BE RELAYED |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

FIG.11

RELAY APPARATUS MANAGEMENT TABLE

| RELAY APPARATUS ID | OPERATING STATE | RECEPTION DATE AND TIME | IP ADDRESS OF RELAY APPARATUS | MAXIMUM DATA TRANSMISSION RATE (Mbps) |
|---|---|---|---|---|
| 111a | ON-LINE | 2009.11.10.13:00 | 1.2.1.2 | 100 |
| 111b | ON-LINE | 2009.11.10.13:10 | 1.2.2.2 | 1000 |
| 111c | OFF-LINE | 2009.11.10.13:20 | 1.3.1.2 | 100 |
| 111d | ON-LINE | 2009.11.10.13:30 | 1.3.2.2 | 10 |

FIG.12

TERMINAL
AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG.13

TERMINAL MANAGEMENT TABLE

| TERMINAL ID | DESTINATION NAME | OPERATING STATE | RECEPTION DATE AND TIME | IP ADDRESS OF TERMINAL |
|---|---|---|---|---|
| 01aa | JAPAN TOKYO OFFICE AA TERMINAL | ON-LINE (TELEPHONE CALL POSSIBLE) | 2009.11.10.13:40 | 1.2.1.3 |
| 01ab | JAPAN TOKYO OFFICE AB TERMINAL | OFF-LINE | 2009.11.09.12:00 | 1.2.1.4 |
| ... | ... | ... | ... | ... |
| 01ba | JAPAN OSAKA OFFICE BA TERMINAL | ON-LINE (BUT TEMPORARILY INTERRUPTED) | 2009.11.10.13:45 | 1.2.2.3 |
| 01bb | JAPAN OSAKA OFFICE BB TERMINAL | ON-LINE (TELEPHONE CALL POSSIBLE) | 2009.11.10.13:50 | 1.2.2.4 |
| ... | ... | ... | ... | ... |
| 01ca | USA NEW YORK OFFICE CA TERMINAL | OFF-LINE | 2009.11.10.12:45 | 1.3.1.3 |
| 01cb | USA NEW YORK OFFICE CB TERMINAL | ON-LINE (ON TELEPHONE CALL) | 2009.11.10.13:55 | 1.3.1.4 |
| ... | ... | ... | ... | ... |
| 01da | USA WASHINGTON OFFICE DA TERMINAL | ON-LINE (ON TELEPHONE CALL) | 2009.11.08.12:45 | 1.3.2.3 |
| 01db | USA WASHINGTON OFFICE DB TERMINAL | OFF-LINE | 2009.11.10.12:45 | 1.3.2.4 |
| ... | ... | ... | ... | ... |

FIG.14

DESTINATION LIST MANAGEMENT TABLE

| REQUEST SOURCE TERMINAL ID | DESTINATION TERMINAL ID |
|---|---|
| 01aa | 01ba,01db |
| 01ab | 01ac,01da,01dc |
| ... | ... |
| 01ba | 01aa,01bb |
| 01bb | 01ba,01dc |
| ... | ... |
| 01ca | 01cb,01cc |
| 01cb | 01ca |
| ... | ... |
| 01da | 01ab,01db,01dc |
| 01db | 01aa,01da |
| ... | ... |

FIG.15

SESSION MANAGEMENT TABLE

| SELECTION SESSION ID | RELAY APPARATUS ID | REQUEST SOURCE TERMINAL ID | DESTINATION TERMINAL ID | DELAY TIME (ms) | DELAY INFORMATION RECEPTION DATE AND TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.16

RELAY POSSIBLE APPARATUS
MANAGEMENT TABLE

| TERMINAL ID | RELAY APPARATUS ID |
|---|---|
| 01aa | 111a,111b |
| 01ab | 111a,111b |
| ... | ... |
| 01ba | 111a,111b |
| 01bb | 111a,111b |
| ... | ... |
| 01ca | 111c |
| 01cb | 111c |
| ... | ... |
| 01da | 111a,111b,111d |
| 01db | 111a,111b,111d |
| ... | ... |

FIG.17

QUALITY MANAGEMENT TABLE

| DELAY TIME (ms) | IMAGE QUALITY (QUALITY OF IMAGE) OF IMAGE DATA |
|---|---|
| 0 ~ 100 | HIGH IMAGE QUALITY |
| 100 ~ 300 | MEDIUM IMAGE QUALITY |
| 300 ~ 500 | LOW IMAGE QUALITY |
| 500 ~ | (INTERRUPTION) |

TRANSMISSION MANAGEMENT SYSTEM, TRANSMISSION SYSTEM, TRANSMISSION MANAGEMENT METHOD, TRANSMISSION MANAGEMENT PROGRAM, COMPUTER READABLE INFORMATION RECORDING MEDIUM, PROGRAM PROVIDING SYSTEM, AND MAINTENANCE SYSTEM

TECHNICAL FIELD

The disclosure relates to selecting a relay apparatus which actually relays content data from among plural relay apparatuses each being capable of relaying content data which is transmitted between plural transmission terminals.

BACKGROUND ART

As one example of a transmission system transmitting content data between plural transmission terminals, a TV conference system for carrying out a TV conference using a communication network such as the Internet may be cited. The necessity of such a TV conference system has been increased along with recent tendency of reducing expenses for business trips and periods of time for business trips. In such a TV conference system, plural TV conference terminals, as examples of transmission terminals, are used. Then, as a result of image data and voice data being transmitted between these TV conference terminals, a TV conference is realized.

Further, along with recent enhancement of broadband environments, high-image-quality image data and/or high-voice-quality voice data can be transmitted. Thereby, it is possible to easily understand situations of other members of a TV conference, and improve fullness of understanding each other via conversations.

However, in a case where many TV conferences are being held via a common communication network or in a case where image data and voice data are received via a narrow band path, a delay may occur in receiving image data and voice data. It is said that when a delay of 0.5 seconds or more occurs in receiving image data or voice data, a user of a TV conference may feel stress during conversation. Therefore, even with recent enhanced broadband environments, there may be a case where a TV conference satisfying users cannot be held.

Further, in a recent TV conference system, for each of plural LANs (Local Area Networks) in a communication network, a relay apparatus that relays image data and voice data between TV conference terminals is provided. These relay apparatuses share necessary communication processes of a TV conference so that a load of each relay apparatus can be reduced, and also, a data transmission amount of image data and voice data to be relayed can be shared.

In the related art, when one of the plural relay apparatuses is selected and used, the relay apparatus used is connected to a LAN to which the TV conference terminal used for the TV conference is also connected. That is, by selecting the relay apparatus having an IP address close to an IP address of the TV conference terminal, it is possible to receive high-image-quality image data or such via the selected relay apparatus (see Japanese Laid-Open Patent Application No. 2008-227577).

In the TV conference system in the related art, the relay apparatus having an IP address close to an IP address of the TV conference terminal used for the TV conference is selected under a supposition that it is possible to receive high-image-quality image data and high-voice-quality voice data via the relay apparatus having an IP address close to an IP address of the TV conference terminal used for the TV conference. However, such a supposition may not necessarily be in accordance with the actual communication network environments. That is, although the relay apparatus having an IP address close to an IP address of the TV conference terminal is used, communication between the TV conference terminal and the relay apparatus may not be available because of an existence a firewall therebetween, or so.

SUMMARY OF INVENTION

According to an embodiment of the present invention, a transmission management system assists in finally narrowing down to one relay apparatus from among plural relay apparatuses for relaying content data to be transmitted between plural transmission terminals via a communication network. The transmission management system includes a relay possible apparatus management part configured to manage, for respective items of transmission terminal identification information for identifying respective transmission terminals, relay apparatus identification information for identifying relay apparatuses being able to relay content data transmitted from the respective transmission terminals; an identification information reception part configured to receive, from the transmission terminal acting as a request source, an item of the terminal identification information for identifying the transmission terminal acting as the request source, and an item of the identification information for identifying the transmission terminal acting as a destination; a preliminary narrowing down part configured to narrow down to two or more of the relay apparatuses before finally narrowing down to one of the relay apparatus by searching the relay possible apparatus management part based on the received item of the terminal identification information for identifying the transmission terminal acting as the request source and the received item of the terminal identification information for identifying the transmission terminal acting as the destination, and extracting items of the relay apparatus identification information common to the transmission terminal acting as the request source and the transmission terminal acting as the destination from among items of relay apparatus identification information corresponding to the respective items of the transmission terminal identification information for identifying the transmission terminal acting as the request source and the transmission terminal acting as the destination.

According to another aspect of the embodiment of the present invention, a transmission management method uses a transmission management system which assists in finally narrowing down to one relay apparatus from among plural relay apparatuses for relaying content data to be transmitted between plural transmission terminals via a communication network. The transmission management system includes a relay possible apparatus management part configured to manage, for respective items of transmission terminal identification information for identifying respective transmission terminals, relay apparatus identification information for identifying relay apparatuses being able to relay content data transmitted from the respective transmission terminals. The transmission management system carries out receiving, from the transmission terminal acting as a request source, an item of the terminal identification information for identifying the transmission terminal acting as the request source, and an item of the identification information for identifying the transmission terminal acting as a destination; narrowing down to two or more of the relay terminals before finally narrowing down to one of the relay apparatus, by searching the relay possible apparatus management part based on the received item of the terminal identification information for identifying the transmission terminal acting as the request source and the received item of the terminal identification information for identifying the transmission terminal acting as the destination, and extracting items of the relay apparatus identification information common to the transmission terminal acting as the request source and the transmission terminal acting as the destination from among items of relay apparatus identification information corresponding to the respective items of the transmission terminal identification information for identifying the transmission terminal acting as the request source and the transmission terminal acting as the destination.

BRIEF DESCRIPTION OF DRAWINGS

FIG. 10 shows a concept of an example of a change quality management table;

FIG. 11 shows a concept of an example of a relay apparatus management table;

FIG. 12 shows a concept of an example of a terminal authentication management table;

FIG. 13 shows a concept of an example of a terminal management table;

FIG. 14 shows a concept of an example of a destination list management table;

FIG. 15 shows a concept of an example of a session management table;

FIG. 16 shows a concept of an example of a relay possible apparatus management table;

FIG. 17 shows a concept of an example of a quality management table;

DESCRIPTION OF EMBODIMENTS

According to an embodiment of the present invention, first, plural relay apparatuses are narrowed down to two or more relay apparatuses each of which can be used by a transmission terminal acting as a request source and a transmission terminal acting as a destination. After that, actually using the respective relay apparatuses thus selected as candidates, certain information is transmitted between the remote communication terminals (i.e., the above-mentioned transmission terminals). Then, one of the relay apparatuses, which one has relayed the certain information with the shortest time required for the actual transmission, is finally selected. Thereby, it is possible to achieve transmission of high-image-quality image data or voice data to the utmost under the actual communication network environment.

First Embodiment

With reference to FIGS. 1 through 25, a first embodiment of the present invention will be described.
[Overall Configuration of Embodiment]

Figure 1:
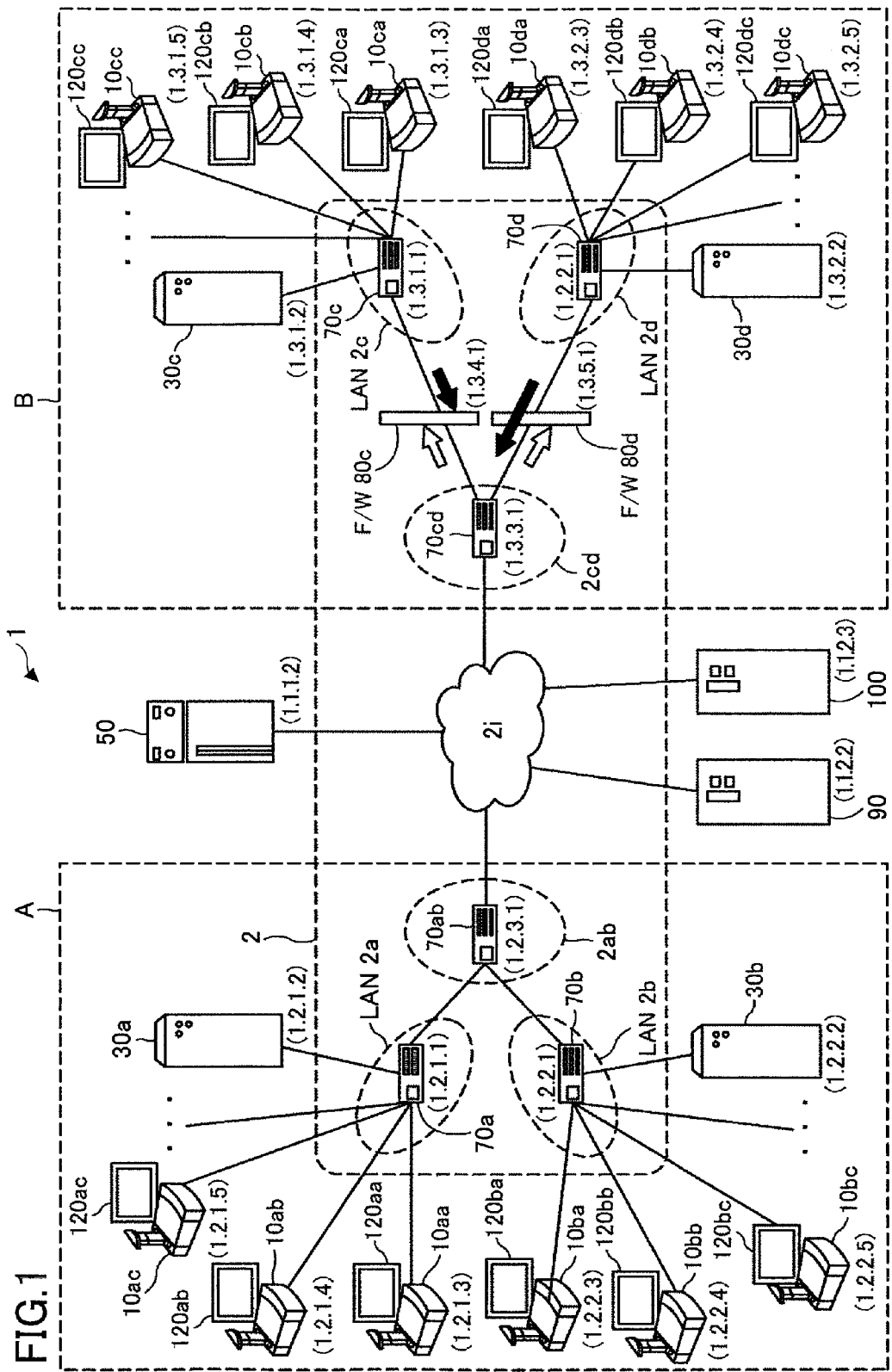
FIG. 1 shows a general configuration of an example of a transmission system according to a first embodiment of the present invention.
Figure 2:
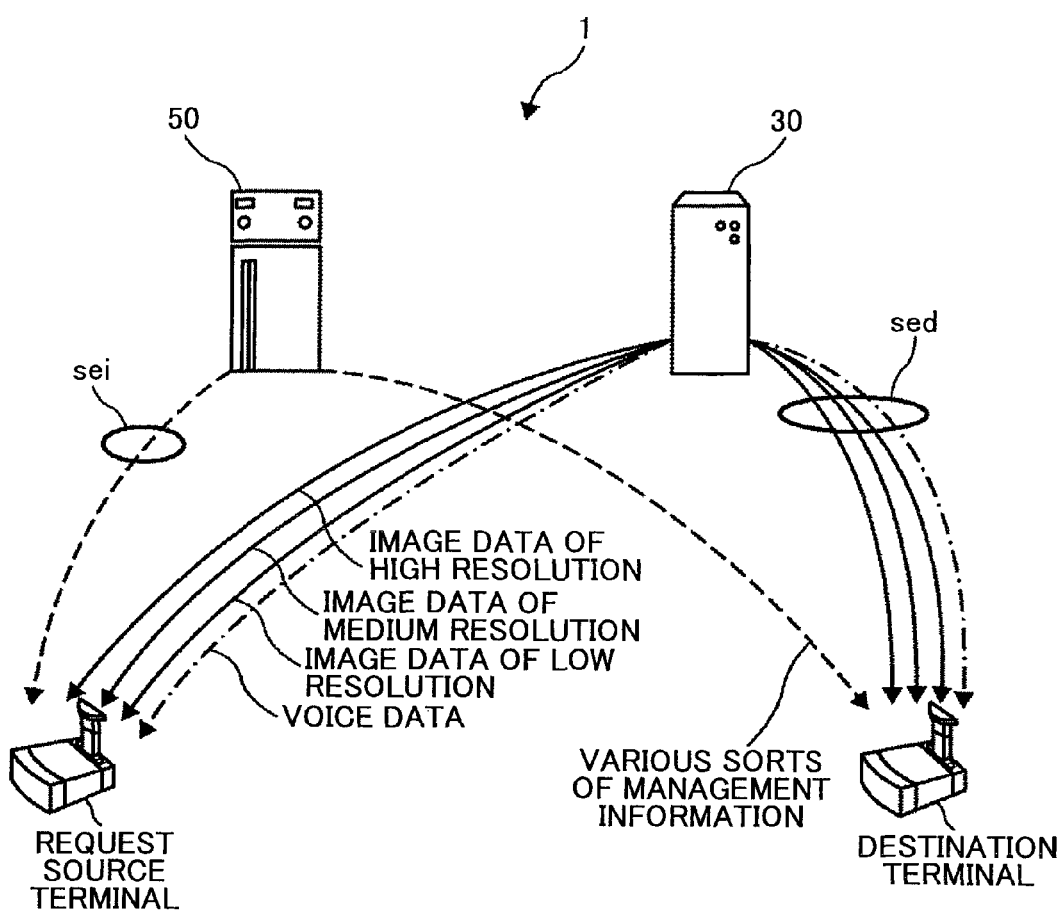
FIG. 2 shows a concept of an example of a state where image data, voice data and various sorts of management information are transmitted and received in the transmission system.
Figure 3:
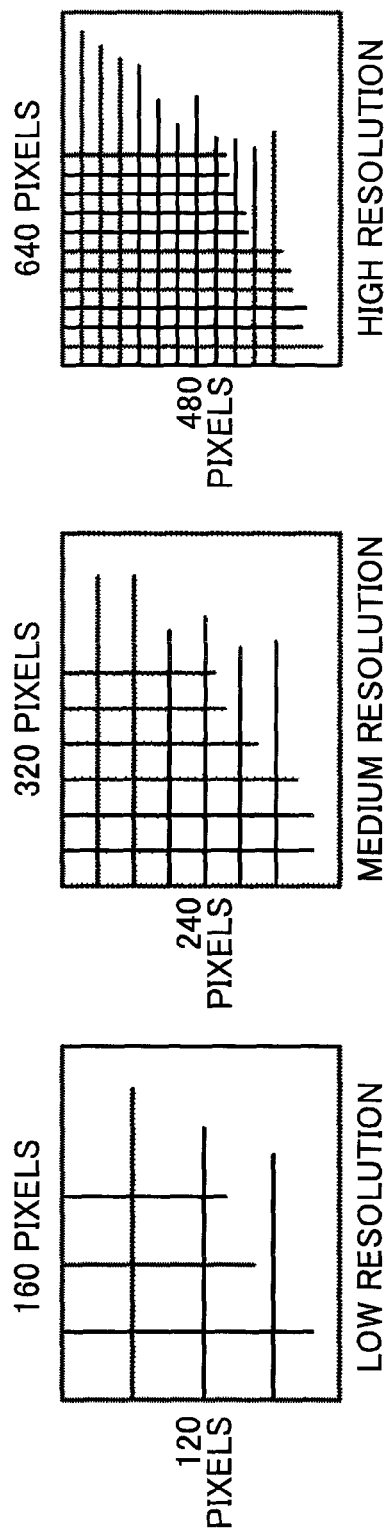
FIG. 3A shows an example of image data of a low resolution for illustrating image quality.
FIG. 3B shows an example of image data of a medium resolution for illustrating image quality.
FIG. 3C shows an example of image data of a high resolution for illustrating image quality.

FIG. 1 shows a general configuration of a transmission system according to the first embodiment of the present invention. FIG. 2 shows a concept of a state where image data, voice data and various sorts of management information are transmitted and received in the transmission system. FIGS. 3A, 3B and 3C illustrate a concept of image quality (i.e., quality of an image) of image data.

The transmission system may be a data providing system transmitting content data from one transmission terminal to another transmission terminal via a transmission management system in one direction. Further, the transmission system may be a communication system transmitting information, feelings or such between plural transmission terminals mutually via a transmission management system. The communication system is a system for mutually transmitting information, feelings or such between plural communication terminals (corresponding to "transmission terminals") via a communication management system (corresponding to a "transmission management system"), and may be used as a TV conference system, a teleconference system or such.

According to the first embodiment, the transmission system, the transmission management system and the transmission terminals will be described assuming a TV conference system as one example of the communication system, assuming a TV conference management system as one example of the communication management system and assuming TV conference terminals as one example of the communication terminals. That is, the transmission terminals and the transmission management system according to the first embodiment of the present invention may be applied not only to a TV conference system, but also to the communication system or the transmission system. It is noted that "TV conference" may also be called "video conference" or such.

First, the transmission system 1 shown in FIG. 1 includes plural transmission terminals (10aa, 10ab, . . . ), display devices (120aa, 120ab, . . . ) for the respective transmission terminals (10aa, 10ab, . . . ), plural relay apparatuses (30a, 30b, 30c and 30d), a transmission management system 50, a program providing system 90 and a maintenance system 100.

The plural terminals (10aa, 10ab, . . . ) carry out transmission and reception of image data and voice data as one example of content data.

It is noted that hereinafter, "transmission terminals" may be simply referred to as "terminals", and the "transmission management system" may be simply referred to as "management system". Further, any terminal of the plural terminals (10aa, 10ab, . . . ) may be referred to as a "terminal 10". Any display device of the plural display devices (120aa, 120ab, . . . ) may be referred to as a "display device 120". Any one of the plural relay apparatuses (30a, 30b, 30c and 30d) may be referred to as a "relay apparatus 30". Further, the terminal acting as a request source requesting a start of a TV conference may be referred to as a "request source terminal", and the terminal acting as a request destination (relay destination) may be referred to as a "destination terminal".

Further, as shown in FIG. 2, in the transmission system, between the transmission source terminal and the destination terminal, a management information session "sei" is established for transmitting various sorts of management information via the management system 50. Further, between the request source terminal and the destination terminal, four sessions are established for transmitting four sorts of data, image data of high resolution, image data of medium resolution, image data of low resolution and voice data, respectively, via the relay apparatus 30. These four sessions may be collectively referred to as an image and voice data session "sed".

Resolution of image data used in the first embodiment will now be described. As shown in FIG. 3A, an image of low resolution as a base image has a configuration of 160 pixels (in a horizontal direction) by 120 pixels (in a vertical direction).

As shown in FIG. 3B, an image of medium resolution has a configuration of 320 pixels (in the horizontal direction) by 240 pixels (in the vertical direction). As shown in FIG. 3C, an image of high resolution has a configuration of 640 pixels (in the horizontal direction) by 480 pixels (in the vertical direction). In a case where a narrow band path is used, image data of low image quality including only image data of low resolution as a base image is relayed. In a case where a band is relatively wide, image data of medium image quality including image data of low resolution as a base image and image data of medium resolution is relayed. In a case where a band is very wide, image data of high image quality including image data of low resolution as a base image, image data of medium resolution and image data of high resolution is relayed.

The relay apparatuses 30 shown in FIG. 1 carry out relaying of content data between the plural terminals 10. The management system 50 manages, in a unifying manner, login authentication requested by the terminals 10, management of communication states of the terminals 10, management of a destination list, communication states of the relay apparatuses 30, and so forth. It is noted that images of the image data may be animations or static images, and may include both animations and static images.

Plural routers (70a, 70b, 70c, 70d, 70ab, 70cd) select optimum paths for image data and voice data. It is noted that hereinafter, any one of the plural routers (70a, 70b, 70c, 70d, 70ab, 70cd) may be referred to as a "router 70".

The program providing system 90 includes a HD (Hard Disk) 204 (described later), stores a program for each of the terminals 10 to carry out various functions (or causing each of the terminals 10 to function as various functional parts), and is capable of transmitting the program for the terminal to each of the terminals 10. Further, the HD 204 of the program providing system 90 also stores a program for each of the relay apparatuses 30 to carry out various functions (or causing each of the relay apparatuses 30 to function as various functional parts), and capable of transmitting the program for the relay apparatus to each of the relay apparatuses 30. Further, the HD 204 of the program providing system 90 also stores a program for transmission management to carry out various functions (or causing the management apparatus 50 to function as various functional parts), and capable of transmitting the program for transmission management to the management apparatus 50.

The maintenance system 100 is a computer carrying out maintenance or management of at least one of the terminals 10, the relay apparatuses 30, the management system 50 and the program providing system 90. For example, in a case where the maintenance system 100 is installed in the home country, and the terminals 10, the relay apparatuses 30, the management system 50 or the program providing system 90 is installed abroad, the maintenance system 100 carries out such as maintenance, management and so forth of at least one of the terminals 10, the relay apparatuses 30, the management system 50 and the program providing system 90 remotely via the communication network 2. Further, the maintenance system 100 carries out maintenance such as management or such of a model number, a production number, a sales destination, maintenance inspection or a history of failures of at least one of the terminals 10, the relay apparatuses 30, the management system 50 and the program providing system 90 without using the communication network 2.

The terminals (10aa, 10ab, 10ac, . . . ), the relay apparatuses 30a and the router 70a are connected together by a LAN 2a in such a manner that they can carry out mutual communication. The terminals (10ba, 10bb, 10bc, . . . ), the relay apparatus 30b and the router 70b are connected together by a LAN 2b in such a manner that they can carry out mutual communication. The LAN 2a and the LAN 2b are connected together by a private line 2ab including the router 70ab in such a manner that they can carry out mutual communication, and are built in a certain area A. For example, the area A is Japan, the LAN 2a is built in any company in Tokyo, and the LAN 2b is built in any company in Osaka.

On the other hand, the terminals (10ca, 10cb, 10cc, . . . ), the relay apparatuses 30c and the router 70c are connected together by a LAN 2c in such a manner that they can carry out mutual communication. The terminals (10da, 10db, 10dc, . . . ), the relay apparatuses 30d and the router 70d are connected together by a LAN 2d in such a manner that they can carry out mutual communication. The LAN 2c and the LAN 2d are connected together by a private line 2cd including the router 70cd in such a manner that they can carry out mutual communication, and are built in a certain area B. For example, the area B is the USA, the LAN 2c is built in any company in New York, and the LAN 2d is built in any company in Washington, D.C. The area A and the area B are connected together in such a manner that they can carry out mutual communication by the Internet 2*i* from the routers (70*ab* and 70*cd*), respectively.

Further, the management system 50 and the program providing system 90 are connected with the terminals 10 and the relay apparatuses 30 in such a manner that they can carry out mutual communication by the Internet 2*i*. The management system 50 and the program providing system 90 may be installed in the area A or the area B, or may be installed in another area.

Further, a firewall 80*c* is provided between the LAN 2*c* and the private line 2*cd*, and a firewall 80*d* is provided between the LAN 2*d* and the private line 2*cd*. The firewall 80*c* carries out static filtering. Specifically, the firewall 80*c* carries out access control of not permitting communication in a case of such a direction of a session (connection) that a session establishment request is carried out from the relay apparatuses 30 (30*a*, 30*b* and 30*d*), the management system 50 or such located in the outside of the LAN 2*c* to the terminals 10 (10*cc*, 10*cb*, 10*cc*, . . . ) in the inside of the LAN 2*c*. Further, the firewall 80*c* carries out access control of not permitting communication also in a case of such a direction of a session that a session establishment request is carried out from the terminals 10 in the inside of the LAN 2*c* to the relay apparatuses 30, the management system 50 or such located in the outside of the LAN 2*c*.

The firewall 80*d* carries out dynamic filtering. Specifically, the firewall 80*d* does not carry out access control of not permitting communication in a case of communication from the terminals 10 (10*da*, 10*db*, 10*dc*, . . . ) in the inside of the LAN 2*d* to the relay apparatuses 30 (30*a*, 30*b* and 30*c*), the management system 50 or such located in the outside of the LAN 2*d*. The firewall 80*d* carries out access control of not permitting communication for a case of communication from the relay apparatuses 30, the management system 50 or such located in the outside of the LAN 2*d* to the terminals 10 in the inside of the LAN 2*d*. However, the firewall 80*d* does not carry out access control of not permitting communication from the outside to the inside of the LAN 2*d* as far as the communication is a reply to communication carried out from the inside to the outside of the LAN 2*d*.

A determination as to whether the communication is a reply is carried out by a determination as to whether the communication is one within a session having been established from the inside to the outside of the LAN 2*d* in a case of TCP (Transmission Control Protocol). In a case of UDP (User Datagram Protocol), the determination is carried out by a determination as to whether the pair of the IP address and the port number of the transmission source and the IP address and the port number of the transmission destination of each packet of content data transmitted from the inside to the outside of the LAN 2*d* are replaced with each other as they are. That is, a case is assumed where the IP address of the terminal 10*da* as the transmission source of communication from the inside to the outside of the LAN 2*d* is "1.3.2.3", the port number used for the transmission is "50000", the IP address of the relay apparatus 30*a* as the transmission destination is "1.2.1.2" and the port number used for the reception is "10000". In this case, in the packet as the reply thereto, the IP address of the relay apparatus 30*a* as the transmission source of "1.2.1.2", the port number of the transmission source of "10000", the IP address of the terminal 10*da* as the transmission destination of "1.3.2.3" and the port number of the transmission destination of "50000" are written.

It is noted that in the first embodiment, the communication network 2 comprises the LAN 2*a*, the LAN 2*b*, the private line tab, the Internet 2*i*, the private line 2*cd*, the LAN 2*c* and the LAN 2*d*. In the communication network 2, not only wired parts, but also wireless parts where communication is carried out wirelessly by WiFi (Wireless Fidelity), Bluetooth (registered trademark), or such, may be included.

Further, in FIG. 1, four sets of numerals below each of the terminals 10, the relay apparatuses 30, the management system 50, the routers 70 and the program providing system 90 show an IP address according to the common IPv4 in a simplified manner. For example, the IP address of the terminal 10*aa* is "1.2.1.3". IPv6 may be used instead of IPv4. However, for the purpose of simplifying the description, the description will be made using IPv4.

It is noted that the respective terminals 10 may be used not only for a telephone call between plural offices (or business places) or different rooms in the same office, but also for a telephone call within the same room, between an outdoor person and an indoor person or between an outdoor person and another outdoor person. In a case where the respective terminals 10 are used outdoors, communication may be carried out wirelessly by using a cell phone communication network or such.

<<Hardware Configuration of Embodiment>>

Next, a hardware configuration of the first embodiment will be described. A case will be described where in a situation where a delay occurs in reception of image data by the terminal 10 acting as the destination (relay destination), the relay apparatus 30 changes (i.e., reduces) the resolution of images of the image data, and then, the image data is transmitted to the terminal 10 acting as the relay destination.

Figure 4:
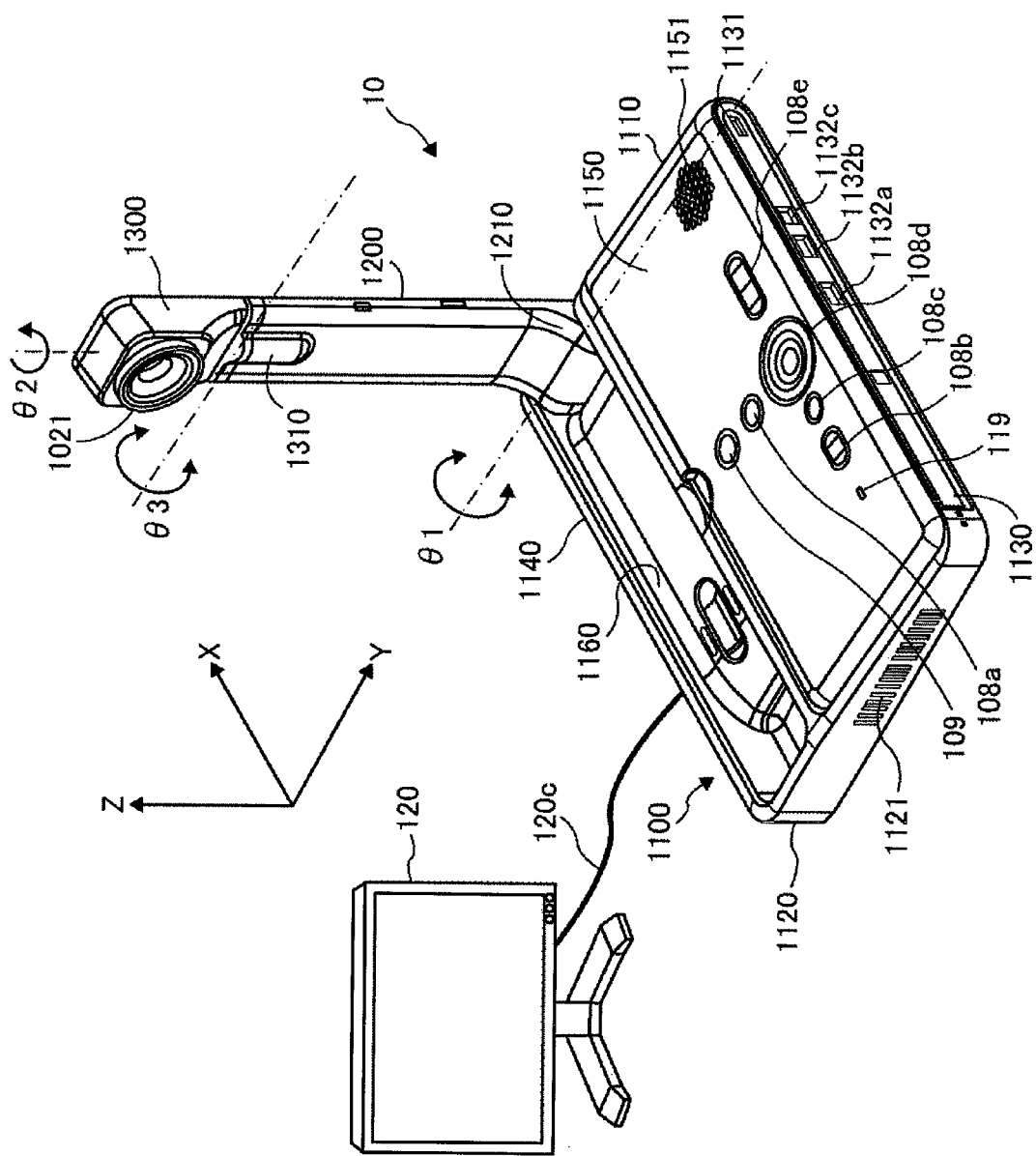
FIG. 4 shows an external appearance (perspective view) of an example of a terminal according to the first embodiment.

FIG. 4 shows an external appearance of the terminal 10 according to the first embodiment. As shown in FIG. 4, the terminal 10 includes a housing 1100, an arm 1200 and a camera housing 1300. On a rear side wall 1110 of the housing 1100, an air suction surface (not shown) including plural air suction holes is provided. On a front side wall 1120 of the housing 1100, an air discharge surface 1121 including plural air discharge holes is provided. Thereby, as a result of a cooling fan (not shown) provided in the inside of the housing 1100 being driven, air behind the terminal 10 is taken in via the air suction surface, and the air is discharged to the front side of the terminal 10 via the air discharge surface 1121. On a right side wall 1130 of the housing 1100, a sound collecting hole 1131 is formed, and a voice, a sound, a noise or such is collected by means of a microphone 114 (see FIG. 5, described later) provided in the inside of the housing 1100 described later.

On a top surface of the housing 1100 on an area near the right side wall 1130, an operations panel 1150 is provided. On the operations panel 1150, plural operating buttons (108*a* through 108*e*) described later, a power supply switch 109 described later and an alarm lamp 119 described later are provided. Also, on the operations panel 1150, a sound output surface 1151 including plural sound output holes formed for passing through an output sound from a speaker 115 provided in the inside of the housing 1100 described later is provided. Further, on the top surface of the housing 1100 on an area near a left side wall 1140, a holding hole 1160 as a depression for receiving the arm 1200 and the camera housing 1300 is provided. On the right side wall 1130 of the housing 1100, plural connection holes (1132*a* through 1132*c*) are provided for electrically connecting cables to an external apparatus connecting I/F 118 described later. On the other hand, on the left side wall 1140 of the housing 1100, a connection hole (not shown) is provided for electrically connecting a cable 120*c* for the display device 120 to the external apparatus connecting I/F 118.

It is noted that hereinafter, in a case where any operating button of the operating buttons (108a through 108e) is referred to, this will be referred to as an "operating button 108". Similarly, in a case where any connection hole of the connection holes (1132a through 1132e) is referred to, this will be referred to as a "connection hole" 1132.

The arm 1200 is mounted on the housing 1100 via a torque hinge 1210, and is configured to be able to rotate vertically in a range of a tilt angle θ1 of 135° with respect to the housing 1100. FIG. 4 shows a state where the tilt angle θ1 is 90°. A camera 112 is provided in the inside of the camera housing 1300, and the user, a document, a room and so forth can be photographed. Further, a torque hinge 1310 is formed in the camera housing 1300. The camera housing 1300 is mounted on the arm 1200 via the torque hinge 1310, and thus a configuration is provided such that the camera housing 1300 can be rotated vertically and horizontally, in a range of a pan angle θ2 of ±180° and in a range of a tilt angle θ3 of ±45°, where FIG. 4 shows a state of 0°.

It is noted that each of the relay apparatuses 30, the management system 50, the program providing system 90 and the maintenance system 100 has an external appearance the same as that of a common server computer. Therefore, description of the external appearances thereof will be omitted.

Figure 5:
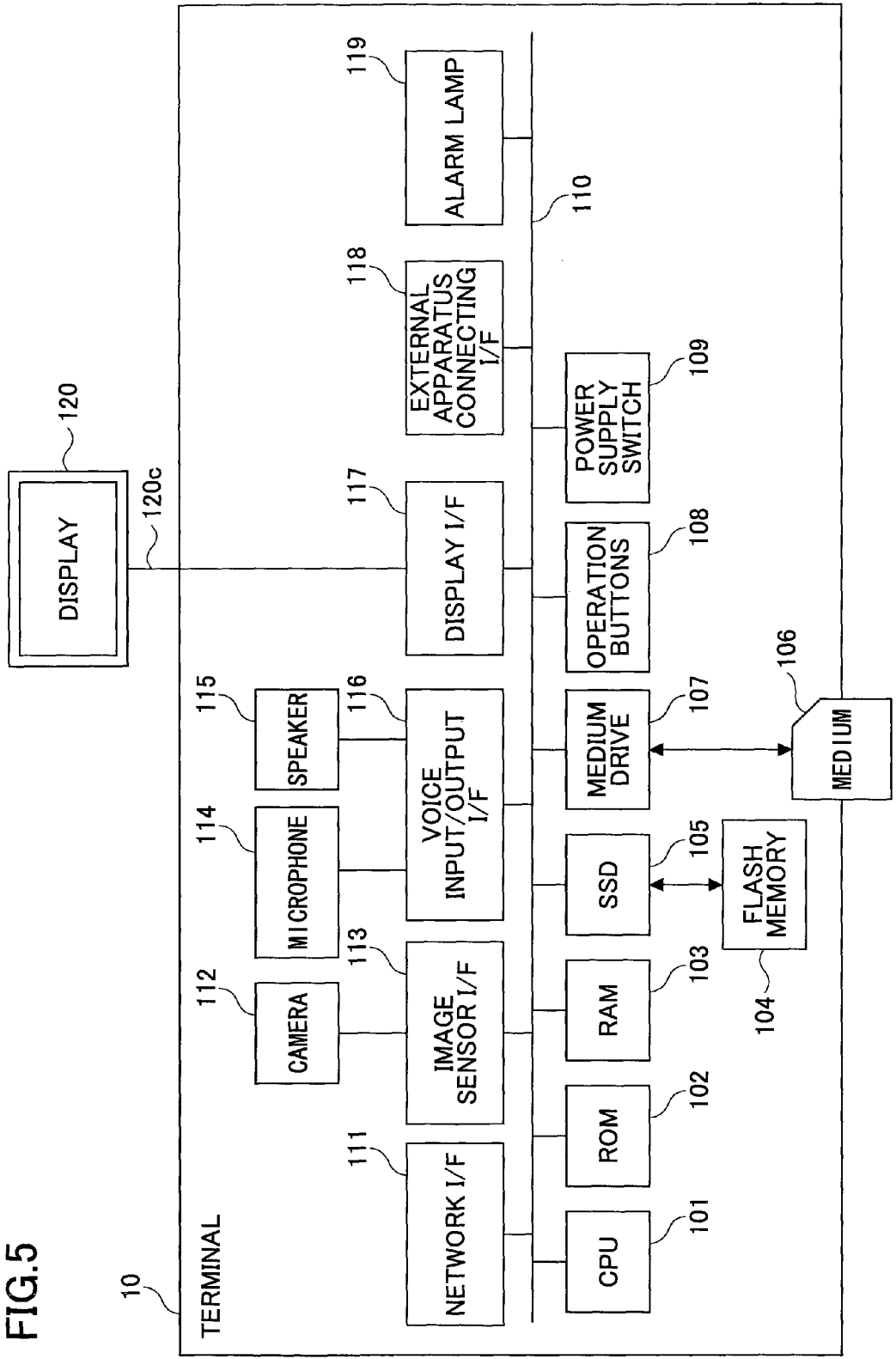
FIG. 5 shows a hardware configuration of an example of the terminal according to the first embodiment.

FIG. 5 shows a hardware configuration of the terminal 10 according to the first embodiment. As shown in FIG. 5, the terminal 10 according to the first embodiment includes a CPU (Central Processing Unit) 101 controlling operations of the entirety of the terminal 10; a ROM (Read Only Memory) 102 storing programs such as an IPL (Initial Program Loader) to be used for driving the CPU 101; a RAM (Random Access Memory) 103 used as a work area of the CPU 101; and flash memory 104 storing a program for the terminal and various data such as image data and voice data. The terminal 10 according to the first embodiment further includes a SSD (Solid State Drive) 105 controlling reading and writing various data from and to the flash memory 104 according to the control of the CPU 101; a medium drive 107 controlling reading and writing (recording) data from and to a recording medium 106 such as a flash memory; the operating buttons 108 operated by the user in a case where the user selects a destination of the terminal 10 or so; the power supply switch 109 for switching turning on/off of the power supply in the terminal 10; and a network I/F (InterFace) 111 for transmitting data using the communication network 2.

Further, the terminal 10 includes the camera 112 of a built-in type photographing an object and obtaining image data according to the control of the CPU 101; an imaging device I/F 113 controlling driving the camera 112; the microphone 114 of a built-in type inputting a voice; the speaker 115 of a built-in type outputting a voice; a voice input/output I/F 116 processing input and output of voice signals from the microphone 114 and to the speaker 115; and a display I/F 117 transmitting image data to the display device 120 provided in the outside according to the control of the CPU 101. The terminal 10 further includes the external apparatus connecting I/F 118 for connecting various types of external apparatuses; the alarm lamp 119 reporting unusual conditions of various functions of the terminal 10; and a bus line 110 such as an address bus, a data bus and so forth for electrically connecting the above-mentioned various elements/components as shown in FIG. 5.

The display device 120 is a display part made of a liquid crystal, organic electroluminescence (EL) material or such displaying an image of an object, operating icons, or such. Further, the display device 120 is connected with the display I/F 117 by a cable 120c. The cable 120c may be a cable for an analog RGB (VGA) signal, a cable for a component video signal, a cable for HDMI (High-Definition Multimedia Interface), a cable for DVI (Digital Video Interactive) signal, or such.

The camera 112 includes a lens and a solid state imaging device converting light into electric charge and obtaining a signal of an image of an object. As the solid state imaging device, a CMOS (Complementary Metal Oxide Semiconductor) device, a CCD (Charge Coupled Device) or such may be used.

To the external apparatus connecting I/F 118, external apparatuses (not shown) such as a camera provided in the outside, a microphone provided in the outside, a speaker provided in the outside and so forth may be electrically connected by USB (Universal Serial Bus) cables or such inserted into the connection holes 1132 of the housing 1100 shown in FIG. 4. In a case where the camera provided in the outside is connected, the cameral provided in the outside is driven with a higher priority than the camera 112 in the built-in type according to the control of the CPU 101. In a case where the microphone provided in the outside or the speaker provided in the outside is connected, the microphone provided in the outside or the speaker provided in the outside is driven with a higher priority than the microphone 114 in the built-in type or the speaker 115 in the built-in type according to the control of the CPU 101.

It is noted that the recording medium 106 is freely detachable from the terminal 10. Further instead of the flash memory 104, an EEPROM (Electrically Erasable and Programmable ROM) or such may be used as long as it is a non-volatile memory for reading and writing data according the control of the CPU 101.

The above-mentioned program for the terminal may be recorded in a computer readable recording medium (the recording medium 106 or such) in a form of a file of an installable type or an executable type, and be circulated. Further, the program for the terminal may be stored in the ROM 102 instead of the flash memory 104.

Figure 6:
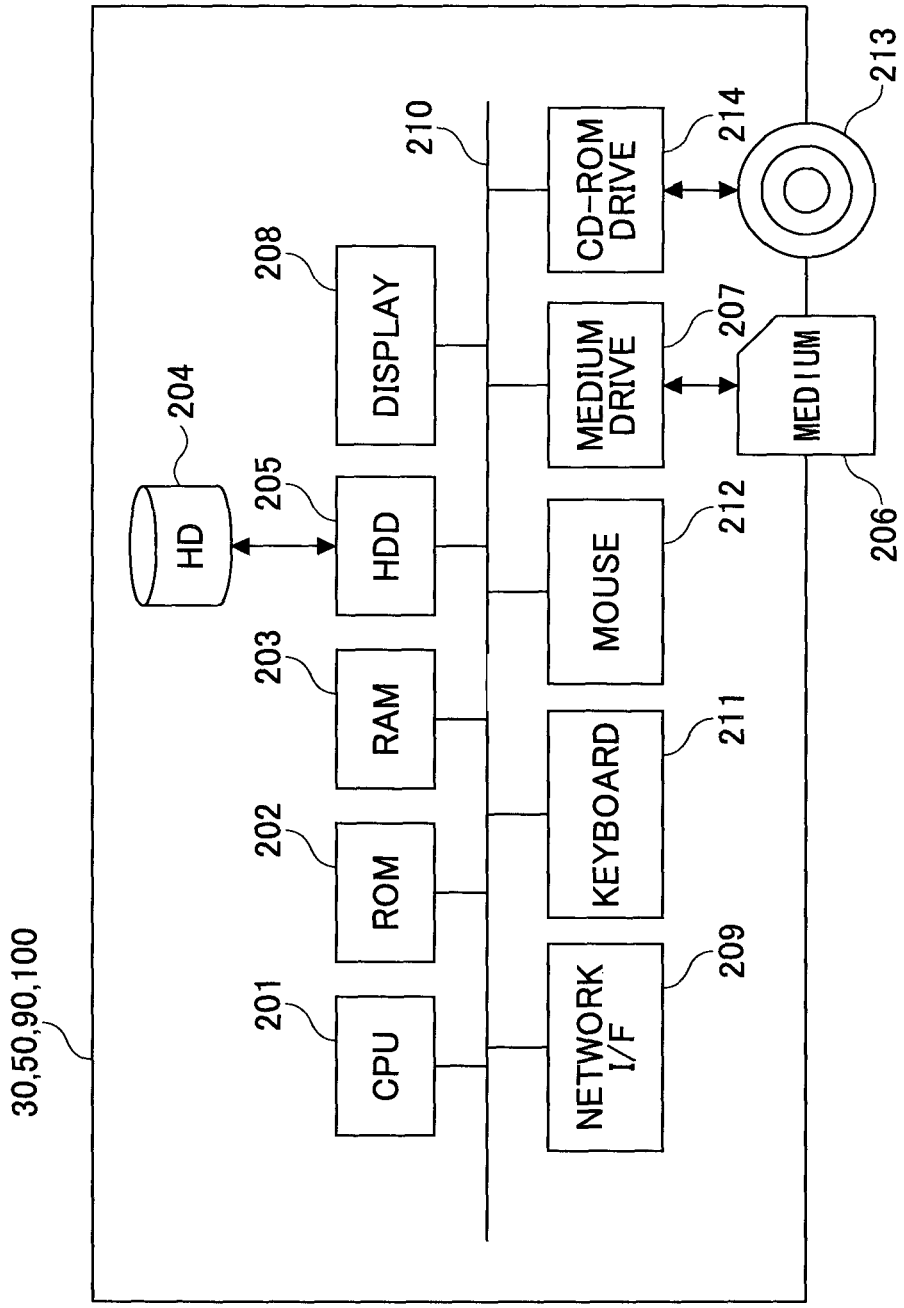
FIG. 6 shows a hardware configuration of an example of each of a management system, a relay apparatus and a program providing system according to the first embodiment.

FIG. 6 shows a hardware configuration of the management system 50 according to the first embodiment. The management system 50 includes a CPU 201 controlling operations of the entirety of the management system 50; a ROM 202 storing a program such as an IPL used for driving the CPU 201; a RAM 203 used as a working area of the CPU 201; a HD (hard disk) 204 storing various data such as the program for transmission management; an HDD (Hard Disk Drive) 205 controlling reading and writing of the various data from and to the HD 204 according to the control of the CPU 201; a medium drive 207 controlling reading and writing (recording) of data from and to a recording medium 206 such as a flash memory; and a display device 208 displaying various sorts of information such as a cursor, a menu, a window, characters/letters (text) or images. The management system 50 further includes a network I/F 209 for carrying out data transmission using the communication network 2; a keyboard 211 including plural keys for the user to input characters/letters, numerical values, various instructions and so forth; a mouse 212 for the user to select or execute various instructions, select a target to process, move the cursor or so; a CD-ROM drive 214 controlling reading various data from a CD-ROM (Compact Disc Read Only Memory) 213 as an example of a detachable recording medium; and a bus line 210 such as an address bus, a data bus and so forth electrically connecting the above-mentioned respective elements/components together as shown in FIG. 6.

It is noted that the program for transmission management may be recorded in a computer readable recording medium such as the above-mentioned recording medium 206, CD- ROM 213 or such in a form of a file of an installable type or an executable type, and be circulated. Further, the program for transmission management may be recorded in the ROM 202 instead of the HD 204.

Further, the relay apparatus 30 has the same hardware configuration as that of the management apparatus 50, and therefore, the description thereof will be omitted. However, in the HD 204 of the relay apparatus 30, a program for the relay apparatus for controlling the relay apparatus 30 is recorded. Also in this case, the program for the relay apparatus may be recorded in a computer readable recording medium such as the recording medium 206, the CD-ROM 213 or such in a form of a file of an installable type or an executable type, and be circulated. Further, the program for the relay apparatus may be stored in the ROM 202 of the relay apparatus 30 instead of the HD 204 of the relay apparatus 30.

Further, each of the program providing system 90 and the maintenance system 100 has the same hardware configuration as that of the management apparatus 50, and therefore, the description thereof will be omitted. However, in the HD 204 of the program providing system 90, a program for controlling the program providing system 90 is recorded. Also in this case, the program for program providing may be recorded in a computer readable recording medium such as the recording medium 206 or the CD-ROM 213 in a form of a file of an installable type or an executable type, and be circulated. Further, the program for program providing may be stored in the ROM 202 instead of the HD 204.

It is noted that each of the above-mentioned programs may be recorded in a computer readable recording medium such as a CD-R (Compact Disc Recordable), a DVD (Digital Versatile Disk) or a Blu-ray Disc as another example of the above-mentioned detachable recording medium, and be provided.

<<Functional Configuration of Embodiment>>

Figure 7:
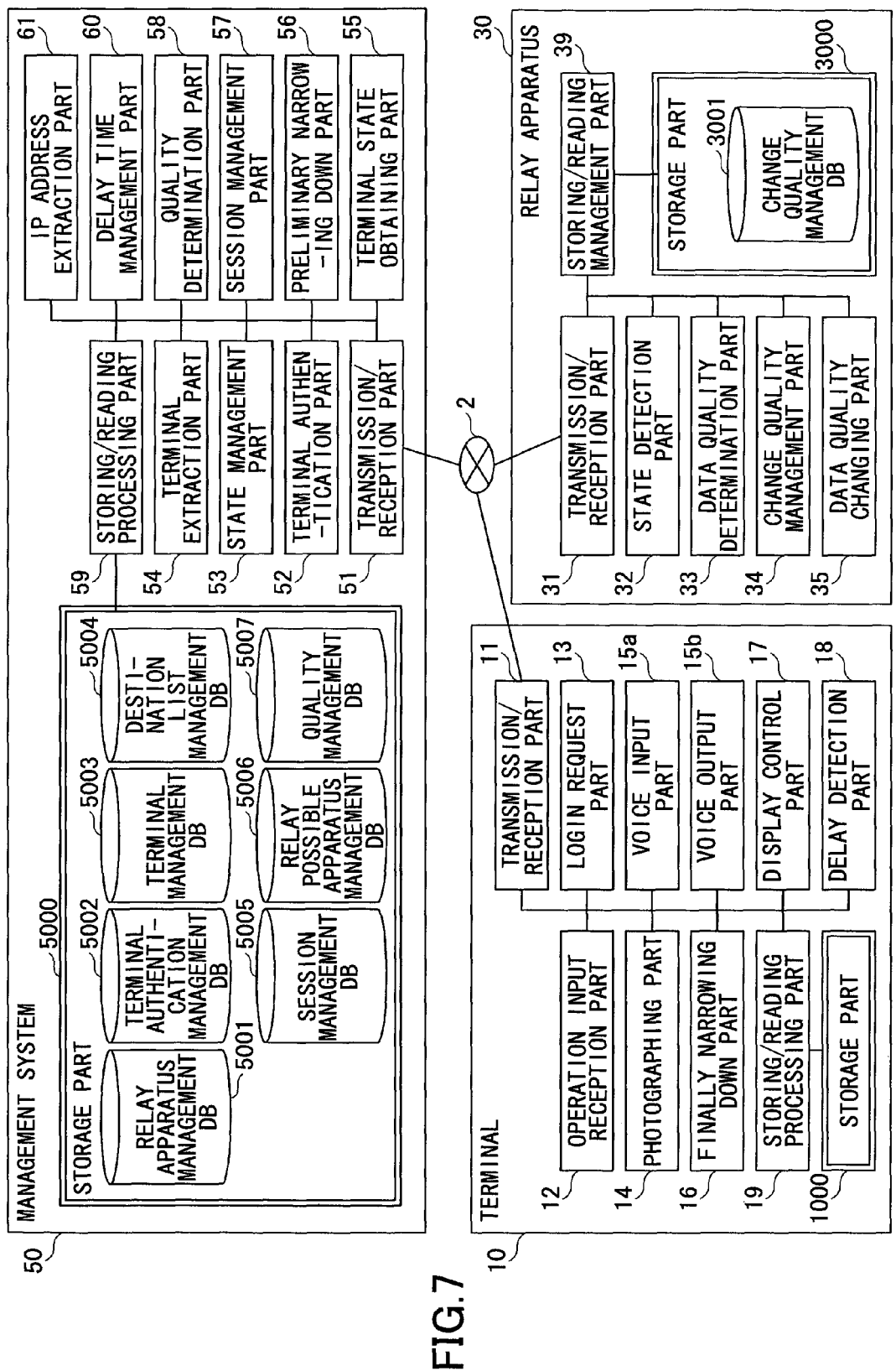
FIG. 7 shows a block diagram of examples of the terminal, the apparatus and the system included in the transmission system according to the first embodiment.

Next, a functional configuration of the first embodiment will be described. FIG. 7 shows a functional block diagram of the terminal 10, the apparatus 30 and the management system 50 included in the transmission system 1 according to the first embodiment. In FIG. 7, the terminal 10, the relay apparatus 30 and the management system 50 are connected together by the communication network 2 in such a manner that data transmission can be mutually carried out. Further, the program providing system 90 shown in FIG. 1 is omitted in FIG. 7 because the program providing system 90 does not directly relate to communication for a TV conference.

<Functional Configuration of Terminal>

The terminal 10 includes a transmission/reception part 11, an operation input reception part 12, a login request part 13, a photographing part 14, a voice input part 15a, a voice output part 15b, a finally narrowing down part 16, a display control part 17, a delay detection part 18 and a storing/reading processing part 19. The respective parts correspond to functions or functioning parts realized as a result of the respective ones of elements/components shown in FIG. 5 operating according to instructions given by the CPU 101 that operates according to the program for the terminal developed on the RAM 103 from the flash memory 104. Further, the terminal 10 has a storage part 1000 built by the RAM 103 and the flash memory 104 shown in FIG. 5.

(Detailed Functional Configuration of Terminal)

Figure 8:
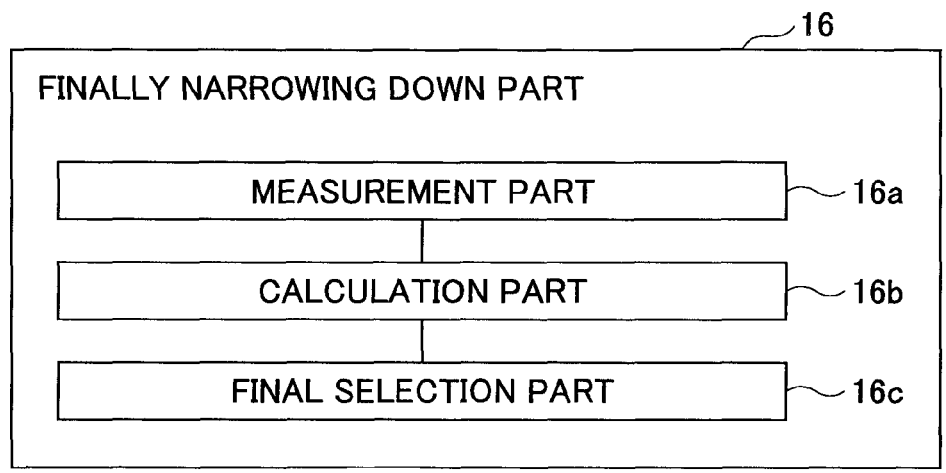
FIG. 8 shows a functional configuration of an example of a final narrowing down part shown in FIG. 7.
Figure 9:
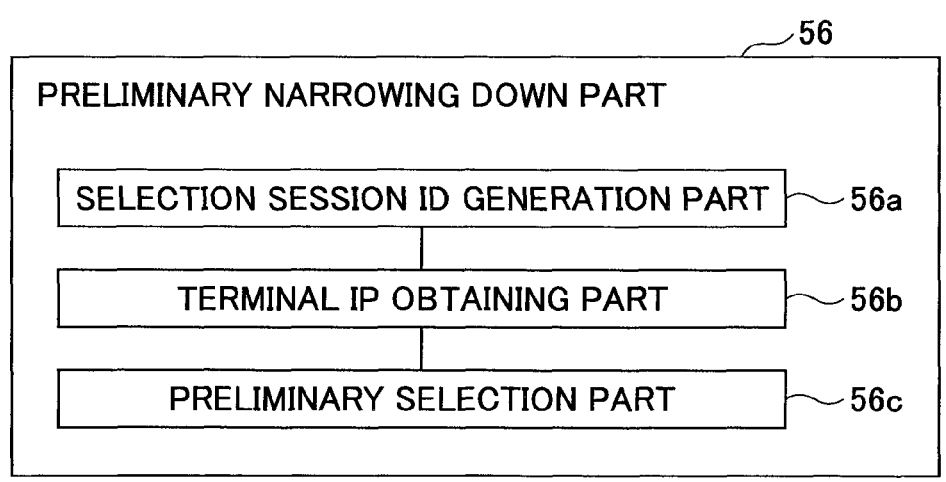
FIG. 9 shows a functional configuration of an example of a preliminary narrowing down part shown in FIG. 7.

With reference to FIGS. 5, 7 through 9, the functional configuration of the terminal 10 will be described in detail. It is noted that FIG. 8 shows a functional configuration of the finally narrowing down part 16. FIG. 9 shows a functional configuration of a preliminary narrowing down part. Further, below, along with describing the functional configuration of the terminal 10, relationships with main elements/components, from among those shown in FIG. 5, used for realizing the functional configuration of the terminal 10 will be also described.

The transmission/reception part 11 of the terminal 10 is realized by instructions from the CPU 101 shown in FIG. 5 and the network I/F 111 shown in FIG. 5, and carries out transmission and reception of various sorts of data (information) with another terminal, apparatus or system via the communication network 2. The transmission/reception part 11 starts reception of respective state information indicating states of respective terminals as candidates for a destination from the management system 50 before starting a telephone call with the desired destination terminal. It is noted that the state information indicates not only an operating state (a state of on-line or off-line) of each terminal but also a detailed state of whether a telephone call is possible even in the state of on-line, whether the user is already on a telephone call, whether the user is leaving his or her seat, and so forth. Further, the state information indicates various states including not only the operating state of each terminal but also whether the cable 120c has been removed from the terminal 10, whether the terminal 10 has been set to output a voice but not output an image, or output no voice (MUTE), and so forth. Below, as one example, a case where the state information indicates the operating state of the terminal 10 will be described.

The operation input reception part 12 is realized by instructions from the CPU 101 shown in FIG. 5 and the operating buttons 108 and the power supply switch 109, and receives various sorts of input operations carried out by the user. For example, when the user turns on the power supply switch 109, the operation input reception part 12 shown in FIG. 7 turns on the power supply in the terminal 10 by receiving the user's operation of turning on the power supply switch 109.

The login request part 13 is realized by instructions from the CPU 101, and automatically transmits login request information indicating to request login and an IP address of the requested terminal at the current time to the management system 50 via the communication network 2 from the transmission/reception part 11 in response to receiving the user's operation of turning on the power supply switch 109. Further, when the user turns off the power supply switch 109 from the turned on state, the transmission/reception part 11 transmits the state information of turning off the power supply to the management system 50, and after that, the operation input reception part 12 completely turns off the power supply in the terminal 10. Thus, the management system 50 can obtain the state where the terminal 10 has changed its state from the power turned on state (power supply ON) to the power turned off state (power supply OFF).

The photographing part 14 is realized by instructions from the CPU 101, and the camera 112 and the imaging device I/F 113 shown in FIG. 5, photographs an object, and outputs image data thus obtained from the photographing.

The voice input part 15a is realized by instructions from the CPU 101, and the voice input/output I/F 116 shown in FIG. 5, and inputs voice data expressed by a voice signal when a voice of the user is converted into the voice signal by the microphone 114. The voice output part 15b is realized by instructions from the CPU 101, and the voice input/output I/F 116, and outputs a voice signal expressing voice data to the speaker 115 and causes the speaker 115 to output a voice.

The finally narrowing down part 16 carries out a final narrowing down process of finally narrowing down plural relay apparatuses 30 into a single relay apparatus 30, and for this purpose, according to instructions from the CPU 101, realizes a measurement part 16a, a calculation part 16b and a final selection part 16c shown in FIG. 8.

The measurement part 16a measures a reception date and time when advance transmission information (described later) is received by the transmission/reception part 11 for each of advance transmission information sets received by the transmission/reception part 11. The calculation part 16b calculates, for each of the advance transmission information sets for which the measurement part 16a has measured the reception date and time, a required time (T) from the transmission of the advance transmission information to the reception thereof based on the difference between the measured reception date and time and the transmission date and time included in the received advance transmission information sets. The final selection part 16c selects the relay apparatus 30 by which the advance transmission information has been relayed having the shortest required time (T) from among the required times (T) calculated by the calculation part 16b, and thus, finally selects the single relay apparatus 30.

The display control part 17 is realized by instructions from the CPU 101, and the display I/F 117 shown in FIG. 5, and, as will be described later, carries out control for combining received image data having different resolutions, and transmitting the combined image data to the display device 120. The display control part 17 can transmit information of a destination list received from the management system 50 to the display device 120, and display the destination list on the display device 120.

The delay detection part 18 is realized by instructions from the CPU 101 and detects a delay time (ms) of image data or voice data sent from another terminal 10 via the relay apparatus 30.

The storing/reading processing part 19 is realized by instructions from the CPU 101 and the SSD 105 shown in FIG. 5, or is realized by instructions from the CPU 101, stores various sorts of data in the storage part 1000, and reads various sorts of data stored in the storage part 1000. In the storage part 1000, terminal IDs (Identifications) for identifying the terminals 10, passwords and so forth are stored. Further, in the storage part 1000, image data and voice data received when a telephone call is carried out with a destination terminal 10 are stored in an overwriting manner each time of receiving. Thereamong, an image is displayed on the display device 120 from the image data before being overwritten, and voice audio is output from the speaker 115 from the voice data before being overwritten.

It is noted that each of the terminal ID and a relay apparatus ID described later according to the first embodiment indicates identification information such as a language, a character/letter, a sign or various sorts of marks used for uniquely identifying a respective one of the terminal 10 and the relay apparatus 30. Further, each of the terminal ID and the relay apparatus ID may be identification information that is a combination of at least two of the above-mentioned language, character/letter, sign and various sorts of marks.

<Functional Configuration of Relay Apparatus>

The relay apparatus 30 includes a transmission/reception part 31, a state detection part 32, a data quality determination part 33, a change quality management part 34, a data quality changing part 35 and a storing/reading management part 39. These respective parts correspond to functions or functioning parts realized as a result of the respective ones of elements/components shown in FIG. 6 operating according to instructions given by the CPU 201 that operates according to the program for the relay apparatus loaded in the RAM 203 from the HD 204. Further, the relay apparatus 30 has a storage part 3000 comprising the RAM 203 and/or the HD 204 shown in FIG. 6. It is noted that FIG. 10 shows a concept of a change quality management table.

(Change Quality Management Table)

In the storage part 3000, a change quality management DB (i.e., DataBase) 3001 including the change quality management table such as that shown in FIG. 10 is stored. In the change quality management table, the IP address of the terminal 10 as a relay destination (or simply a destination) of image data and the image quality of the image relayed by the relay apparatus 30 to the relay destination are associated with one another and are managed.

(Detailed Functional Configuration of Relay Apparatus)

Next, the functional configuration of the relay apparatus 30 will be described in detail. It is noted that below, along with describing the functional configuration of the relay apparatus 30, relationships with main elements/components, from among those shown in FIG. 6, used for realizing the functional configuration of the relay apparatus 30 will be also described.

The transmission/reception part 31 of the relay apparatus 30 shown in FIG. 7 is realized by instructions from the CPU 201 shown in FIG. 6 and the network I/F 209, and carries out transmission and reception of various sorts of data (information) with another terminal, apparatus or system via the communication network 2.

The state detection part 32 is realized by instructions from the CPU 201, and detects an operating state of the relay apparatus 30 having this state detection part 32. The operating state may be a state of "on-line", "off-line", "on a telephone call" or "temporarily interrupted".

The data quality determination part 33 is realized by instructions from the CPU 201, searches the change quality management DB 3001 (see FIG. 10) using the IP address of a destination terminal as a search key, extracts the image quality of the corresponding image data to be relayed, and thus recognizes the image quality of the image data to be relayed.

The change quality management part 34 is realized by instructions from the CPU 201, and changes the contents of the change quality management DB 3001 based on quality information (described later) which is sent from the management system 50. For example, a case is assumed in which a TV conference is being conducted between a request source terminal (terminal 10aa) having the terminal ID "01aa" and a destination terminal (terminal 10db) having the terminal ID "01db" where image data of high image quality is mutually transmitted, and a delay in receiving the image data occurs in the destination terminal (terminal 10db) because another request source terminal (terminal 10bb) and another destination terminal (10ca) have started another TV conference using the communication network 2, or so. In such a case, the relay apparatus 30 reduces the image quality of image data, having been relayed by the relay apparatus 30 itself until now, from the high image quality to the medium image quality. In such a, case, based on the quality information indicating this medium image quality, the contents of the change quality management DB 3001 are changed so that the image quality of the image data which the relay apparatus 30 is relaying is reduced from the high image quality to the medium image quality.

The data quality changing part 35 is realized by instructions from the CPU 201, and changes the image quality of the image data sent from the transmission source terminal 10 based on the contents of the change quality management DB 3001 changed as mentioned above.

The storing/reading management part 39 is realized by instructions from the CPU 201 and the HDD 205 shown in FIG. 6, and carries out processing of recording various sorts of data in the storage part 3000 and reading various sorts of data stored in the storage part 3000.

<Functional Configuration of Management System>

The management system 50 includes a transmission/reception part 51, a terminal authentication part 52, a state management part 53, a terminal extraction part 54, a terminal state obtaining part 55, a preliminary narrowing down part 56, a session management part 57, a quality determination part 58, a storing/reading processing part 59, a delay time management part 60 and an IP address extraction part 61. These respective parts correspond to functions or functioning parts realized as a result of the respective ones of elements/components shown in FIG. 6 operating according to instructions given by the CPU 201 that operates according to the program for the management system loaded in the RAM 203 from the HD 204. Further, the management system 50 has a storage part 5000 comprising the HD 204 shown in FIG. 6.

It is noted that FIG. 11 shows a concept of a relay apparatus management table. FIG. 12 shows a concept of a terminal authentication management table. FIG. 13 shows a concept of a terminal management table. FIG. 14 shows a concept of a destination list management table. FIG. 15 shows a concept of a session management table. FIG. 16 shows a concept of a relay possible apparatus management table. FIG. 17 shows a concept of a quality management table.

(Relay Apparatus Management Table)

In the storage part 5000, a relay apparatus management DB 5001 including the relay apparatus management table such as that shown in FIG. 11 is stored. In the relay apparatus management table, for each of the relay apparatuses 30, the relay apparatus ID of the relay apparatus 30, the operating state of the relay apparatus 30, the reception date and time when the state information indicating the operating state has been received by the management system 50, the IP address of the relay apparatus 30 and the maximum data transmission rate (Mbps) in the relay apparatus 30 are associated with each other and are managed. For example, in the relay apparatus management table shown in FIG. 11, it is indicated that the relay apparatus 30a having the relay apparatus ID "111a" has the operating state of "on-line", the date and time when the state information has been received in the management system 50 are "Nov. 10, 2009, 13:00", the IP address of the relay apparatus 30a is "1.2.1.2", and the maximum data transmission rate in the relay apparatus 30a is 100 Mbps.

(Terminal Authentication Management Table)

Further, in the storage part 5000, a terminal authentication management DB 5002 including the terminal authentication management table such as that shown in FIG. 12 is stored. In the terminal authentication management table, respective passwords are associated with the terminal IDs of all the terminals 10 managed by the management system 50 and are managed. For example, in the terminal authentication management table shown in FIG. 12, it is indicated that the terminal ID of the terminal 10aa is "01aa", and the password is "aaaa".

(Terminal Management Table)

Further, in the storage part 5000, a terminal management DB 5003 including the terminal management table such as that shown in FIG. 13 is stored. In the terminal management table, for the terminal ID of each of the terminals 10, a destination name for a case where the terminal 10 acts as a destination, the operating state of the terminal 10, the reception date and time when login request information (described later) has been received by the management system 50, and the IP address of the terminal 10 are associated with each other and are managed. For example, in the terminal management table shown in FIG. 13, it is indicated that the terminal 10aa having the terminal ID "01aa" has the destination name "JAPAN TOKYO OFFICE AA TERMINAL", the operating state "on-line (telephone call possible)", the reception date and time when the login request information has been received in the management system 50 is "Nov. 10, 2009, 13:40", and the IP address of the terminal 10aa is "1.2.1.3".

(Destination List Management Table)

Further, in the storage part 5000, a destination list management DB 5004 including the destination list management table such as that shown in FIG. 14 is stored. In the destination list management table, for the terminal ID of a request source terminal which requests to start a telephone call in a TV conference, all of the terminal IDs of the destination terminals registered as candidates for a destination are associated and are managed. For example, in the destination list management table shown in FIG. 14, it is indicated that the candidates for a destination terminal for which the request source terminal (terminal 10aa) can request to start a telephone call in a TV conference are the terminal 10ba having the terminal ID "01ba" and the terminal 10db having the terminal ID "01db". The candidates for a destination terminal are updated as a result of addition or deletion according to a request of addition or deletion from any request source terminal to the management system 50.

(Session Management Table)

Further, in the storage part 5000, a session management DB 5005 including the session management table such as that shown in FIG. 15 is stored. In the session management table, for each of selection session IDs used for carrying out a session (selection session) for selecting the relay apparatus 30, the relay apparatus ID of the relay apparatus 30 used for relaying image data and voice data, the terminal ID of the request source terminal, the terminal ID of the destination terminal, a delay time (ms) of reception when image data is received in the destination terminal, and the reception date and time when delay information indicating the delay time has been sent from the destination terminal and received in the management system 50 are associated with each other and managed. For example, in the session management table shown in FIG. 15, it is indicated that the relay apparatus 30a (the relay apparatus ID "111a") selected by the session executed using the selection session ID "se1" has relayed image data and voice data between the request source terminal (terminal 10aa) of the terminal ID "01aa" and the destination terminal (terminal 10db) of the terminal ID "01db", and the delay time of the image data is 200 (ms) at the time of "Nov. 10, 2009, 14:00" at the destination terminal (the terminal 10db). It is noted that in a case where a TV conference is carried out between two terminals 10, the reception date and time of the delay information may be managed based on the delay information sent from the request source terminal instead of the destination terminal. However, in a case where a TV conference is conducted between three or more terminals 10, the reception date and time of the delay information is managed based on the delay information sent from the terminal which has received the image data and the voice data.

(Relay Possible Apparatus Management Table)

Further, in the storage part 5000, a relay possible apparatus management DB 5006 including the relay possible apparatus management table such as that shown in FIG. 16 is stored. In the relay possible apparatus management table, for each of the terminal IDs for identifying the respective terminals 10, the relay apparatus IDs of the relay apparatuses 30 which can relay content data transmitted by the terminal 10 with respect to, for example, whether a firewall or such does not prevent the relay apparatus 30 from relaying content data transmitted by the terminal 10 are associated and managed. For example, in the relay possible apparatus management table shown in FIG. 16, it is indicated that in a case of the terminal 10aa of the terminal ID "01aa", a TV conference can be carried out with a destination terminal 10 using the relay apparatus 30a of the relay apparatus ID "111a" or the relay apparatus 30b of the relay apparatus ID "111b" for relaying.

Further, the manager of the management system 50 inquires of the user or such of each of the terminals 10, determines which type (carrying out dynamic filtering or static filtering) of a firewall is installed at which position in the communication network 2, and then, creates the relay possible apparatus management table shown in FIG. 16.

(Quality Management Table)

Further, in the storage part 5000, a quality management DB 5007 including the quality management table such as that shown in FIG. 17 is stored. In the quality management table, the delay time of image data and image quality (quality of an image) of the image data are associated with one another are managed in such a manner that as the delay time (ms) of image data at a request source terminal or a destination terminal is longer, the image quality of the image data relayed by the relay apparatus 30 is to be reduced. It is noted that in a case where the delay time is more than "500 ms", the communication is to be interrupted ("INTERRUPTION") since the delay is too much.

(Detailed Functional Configuration of Management System)

Next, the functional configuration of the management system 50 will be described in detail. It is noted that below along with describing the functional configuration of the management system 50, relationships with main elements/components, from among those shown in FIG. 6, used for realizing the functional configuration of the management system 50 will be also described.

The transmission/reception part 51 shown in FIG. 7 is realized by instructions from the CPU 201 shown in FIG. 6 and the network I/F 209 shown in FIG. 6, and carries out transmission and reception of various sorts of data (information) with another terminal, apparatus or system via the communication network 2.

The terminal authentication part 52 is realized by instructions from the CPU 201, searches the terminal authentication management DB 5002 of the storage part 5000 using the terminal ID and the password included in the login request information received via the transmission/reception part 51 as search keys, and carries out authentication of the terminal 10 by determining whether the same terminal ID and password are managed in the terminal authentication management DB 5002.

The state management part 53 is realized by instructions from the CPU 201, and for the purpose of managing the operating state of a request source terminal which has requested to login, stores the terminal ID of the request source terminal, the operating state of the request source terminal, the reception date and time when the login request information has been received in the management system 50 and the IP address of the request source terminal in the terminal management DB 5003 (see FIG. 13) in a manner of associating them with each other and manages them. Further, the state management part 53 changes the operating state indicating on-line in the terminal management DB 5003 into off-line based on the state information indicating that power supply will be turned off sent from a terminal 10 in response to the user of the terminal 10 turning off the power supply switch 109 of the terminal 10.

The terminal extraction part 54 is realized by instructions from the CPU 201, searches the destination list management DB 5004 (see FIG. 14) using the terminal ID of a request source terminal which has requested to login as a search key, reads the terminal IDs as candidates for a destination terminal which can carry out a telephone call with the request source terminal, and extracts the terminal IDs. Further, the terminal extraction part 54 searches the destination list management DB 5004 using the terminal ID of a request source terminal which has requested to login as a search key, and extracts also the terminal IDs of the other request source terminals each of which has registered the terminal ID of the request source terminal as a candidate for a destination terminal.

The terminal state obtaining part 55 is realized by instructions from the CPU 201, searches the terminal management DB 5003 (see FIG. 13) using the terminal IDs of candidates for a destination terminal extracted by the terminal extraction part 54 as search keys, and reads the operating state for each of the terminal IDs extracted by the terminal extraction part 54. Thereby, the terminal state obtaining part 55 can obtain the operating states of the candidates for a destination terminal which can carry out a telephone call with the request source terminal having requested to login. Further, the terminal state obtaining part 55 searches the terminal management DB 5003 using the terminal ID of the request source terminal having requested to login, and obtains the operating state of the request source terminal having requested to login.

The preliminary narrowing down part 56 is realized by instructions from the CPU 201, and, for the purpose of assisting in a finally narrowing down process of finally narrowing down plural relay apparatuses 30 to a single relay apparatus 30, carries out a preliminary narrowing down process of narrowing down to two or more of the relay apparatuses 30 before the finally narrowing down process. For this purpose, the preliminary narrowing down part 56 realizes a selection session ID generation part 56a, a terminal ID obtaining part 56b and a preliminary selection part 56c by instructions from the CPU 201, as shown in FIG. 9.

The selection session ID generation part 56a generates a selection session ID to be used for carrying out a session (selection session) for selecting relay apparatuses 30. The terminal ID obtaining part 56b extracts and obtains the terminal ID of the request source terminal and the terminal ID of the destination terminal from start request information sent from the request source terminal.

Further, the preliminary selection part 56c searches the relay possible apparatus management DB 5006 using the terminal ID of the request source terminal and the terminal ID of the destination terminal obtained by the terminal ID obtaining part 56b as search keys, and selects the two or more relay apparatuses 30 by thus extracting the common relay apparatuses IDs (corresponding to both the terminal ID of the request source terminal and the terminal ID of the destination terminal from among the relay apparatus IDs corresponding to the respective terminal IDs. For example, in the relay possible apparatus table shown in FIG. 16, the relay apparatuses 30 common to the terminal 10aa of the terminal ID "01aa" and the terminal 10db of the terminal ID "01db" which can relay therebetween are the relay apparatus 30a of the relay apparatus ID "111a" and the relay apparatus 30b of the relay apparatus ID "111b". Further, the preliminary selection part 56c selects the relay apparatus IDs of the relay apparatuses 30 having the operating state of "on-line" from among the relay apparatuses 30 managed by the relay apparatus management DB 5001 (see FIG. 11), and thus selects the relay apparatuses 30.

Next, the session management part 57 is realized by instructions from the CPU 201, stores the selection session ID generated by the selection session ID generation part 56a, the terminal ID of the request source terminal and the terminal ID of the destination terminal in a manner of associating them with each other in the session management. DB 5005 (see FIG. 15) of the storage part 5000, and manages them. Further, the session management part 57 stores for each of the selection session IDs, the relay apparatus ID of the relay apparatus 30 which has been finally narrowed down to one by the finally narrowing down part 16 of the terminal 10 in the session management DB 5005 (see FIG. 15) and manages them.

The quality determination part 58 searches the quality management DB 5007 (see FIG. 17) using the above-mentioned delay time as a search key, extracts the image quality of the corresponding image data, and determines the image quality of the image data to be relayed by the relay apparatus 30.

The storing/reading processing part 59 is realized by instructions from the CPU 201 and by the HDD 205 shown in FIG. 6, stores various sorts of data in the storage part 5000 and reads various sorts of data stored in the storage part 5000.

The delay time management part 60 is realized by instructions from the CPU 201, searches the terminal management DB 5003 (see FIG. 13) using the IP address of the above-mentioned destination terminal, extracts the corresponding terminal ID, and further stores the delay time indicated by the above-mentioned delay information at the field of delay time in the record including the thus-extracted terminal ID in the session management table of the session management DB 5005 (see FIG. 15), and manages it.

The IP address extraction part 61 searches the relay apparatus management DB 5001 using a relay apparatus ID as a search key, and extracts the IP address of the corresponding relay apparatus 30.

<<Processing/Operations of Embodiment>>

Figure 18:
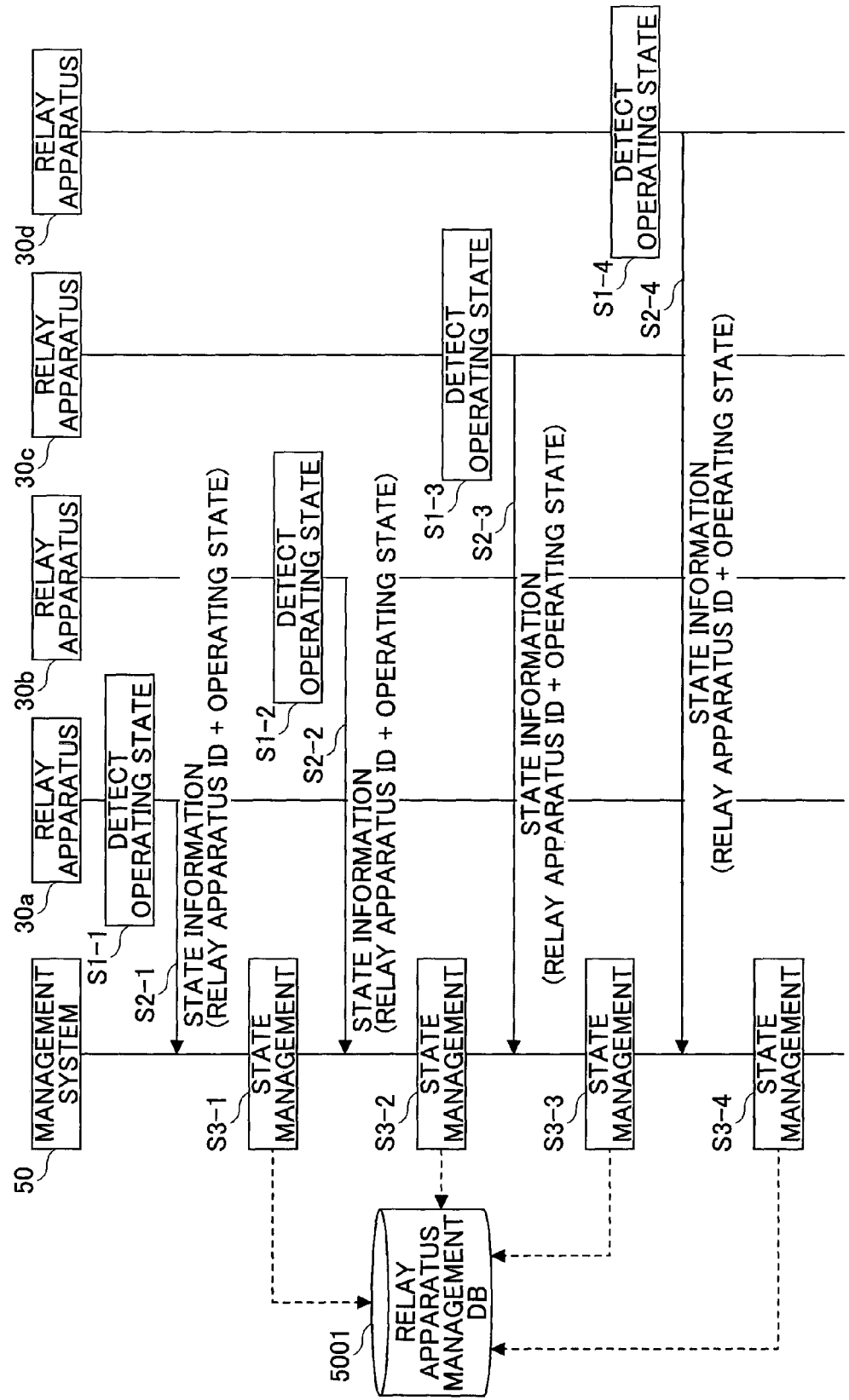
FIG. 18 shows an example of a sequence diagram of a process of managing state information indicating an operating state of each of the relay apparatuses.
Figure 19:
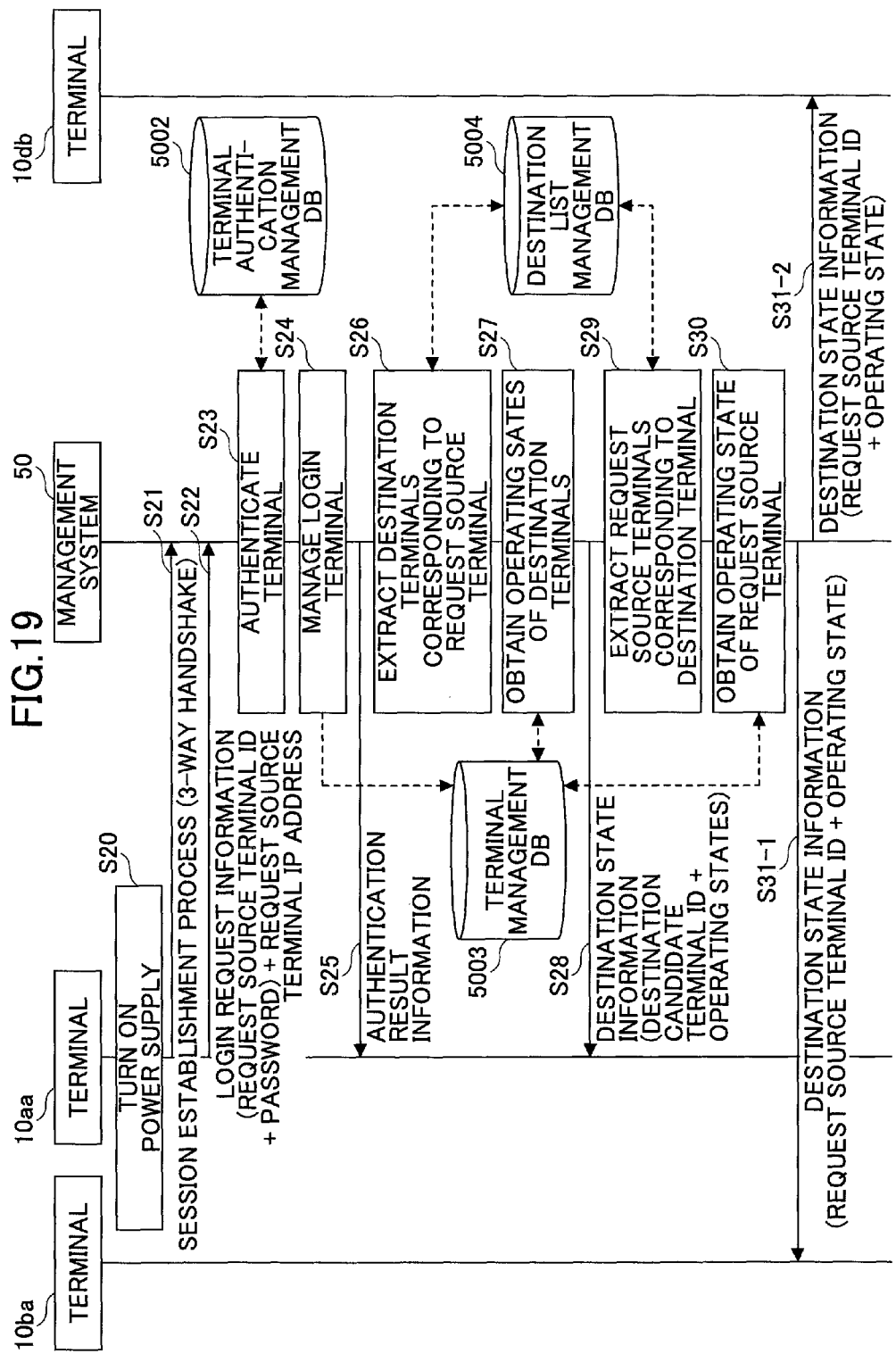
FIG. 19 shows an example of a sequence diagram of a process of a preparation step for starting remote communication between the terminals.
Figure 20:
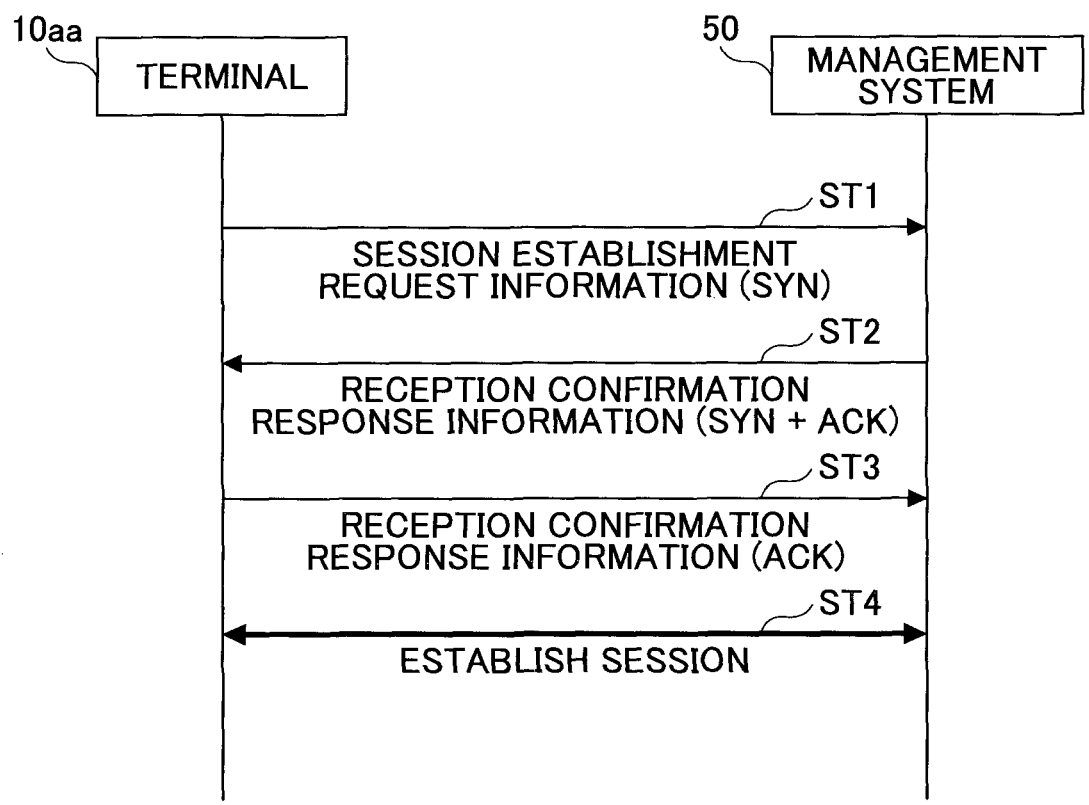
FIG. 20 shows an example of a sequence diagram of a process of session establishment.
Figure 21:
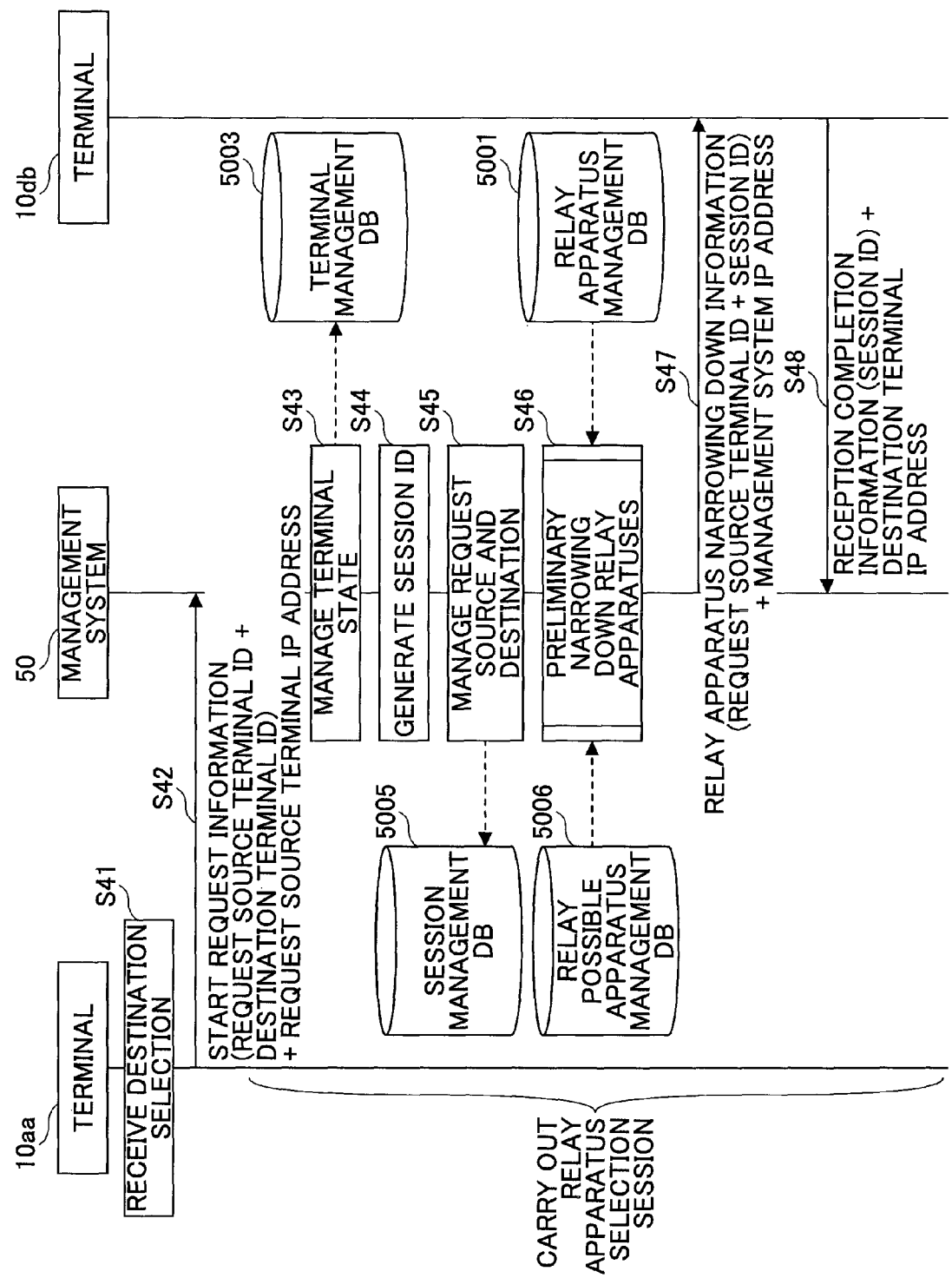
FIG. 21 shows an example of a sequence diagram of a process of narrowing down the relay apparatuses.
Figure 22:
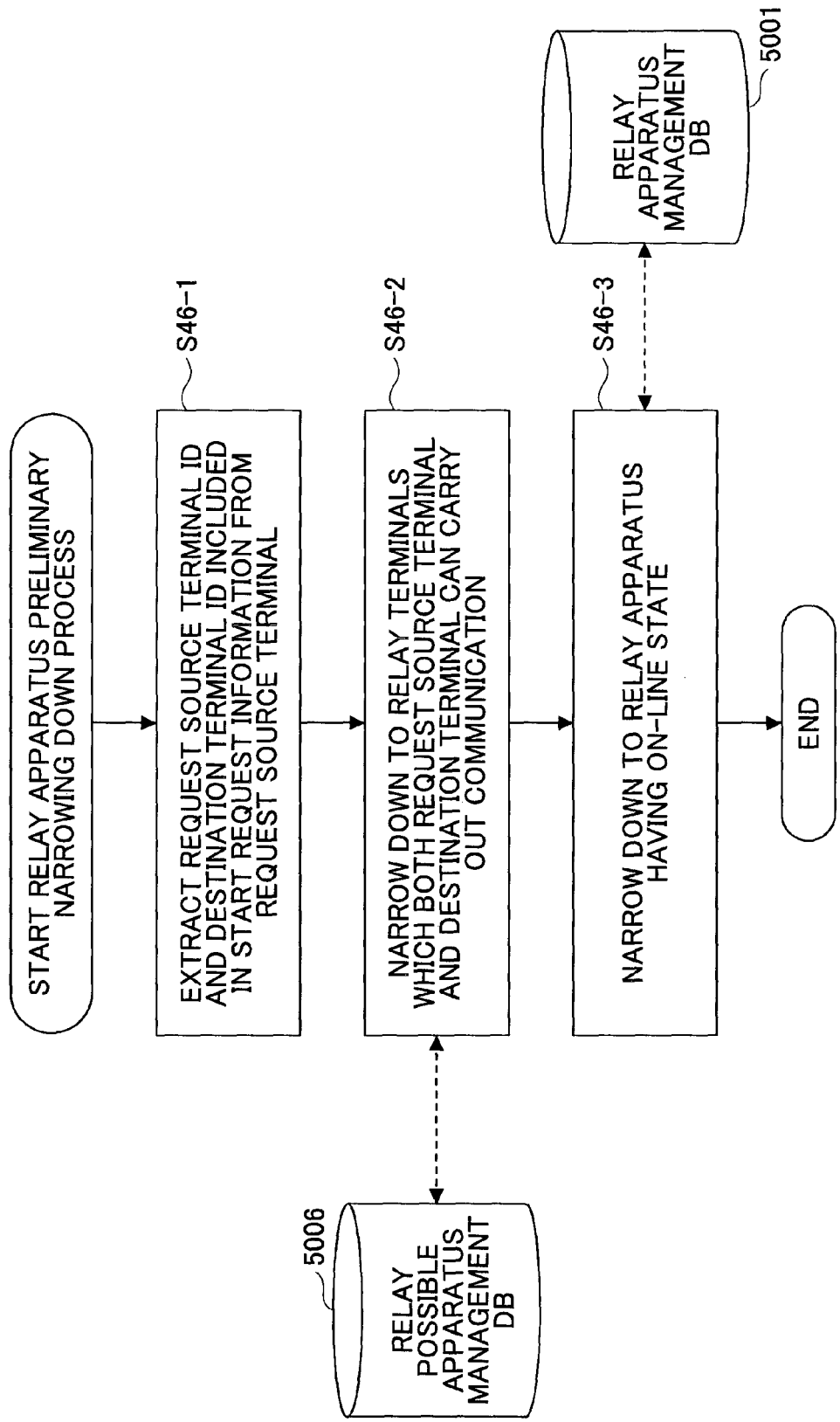
FIG. 22 shows an example of a flowchart of a process of narrowing down the relay apparatuses.
Figure 23:
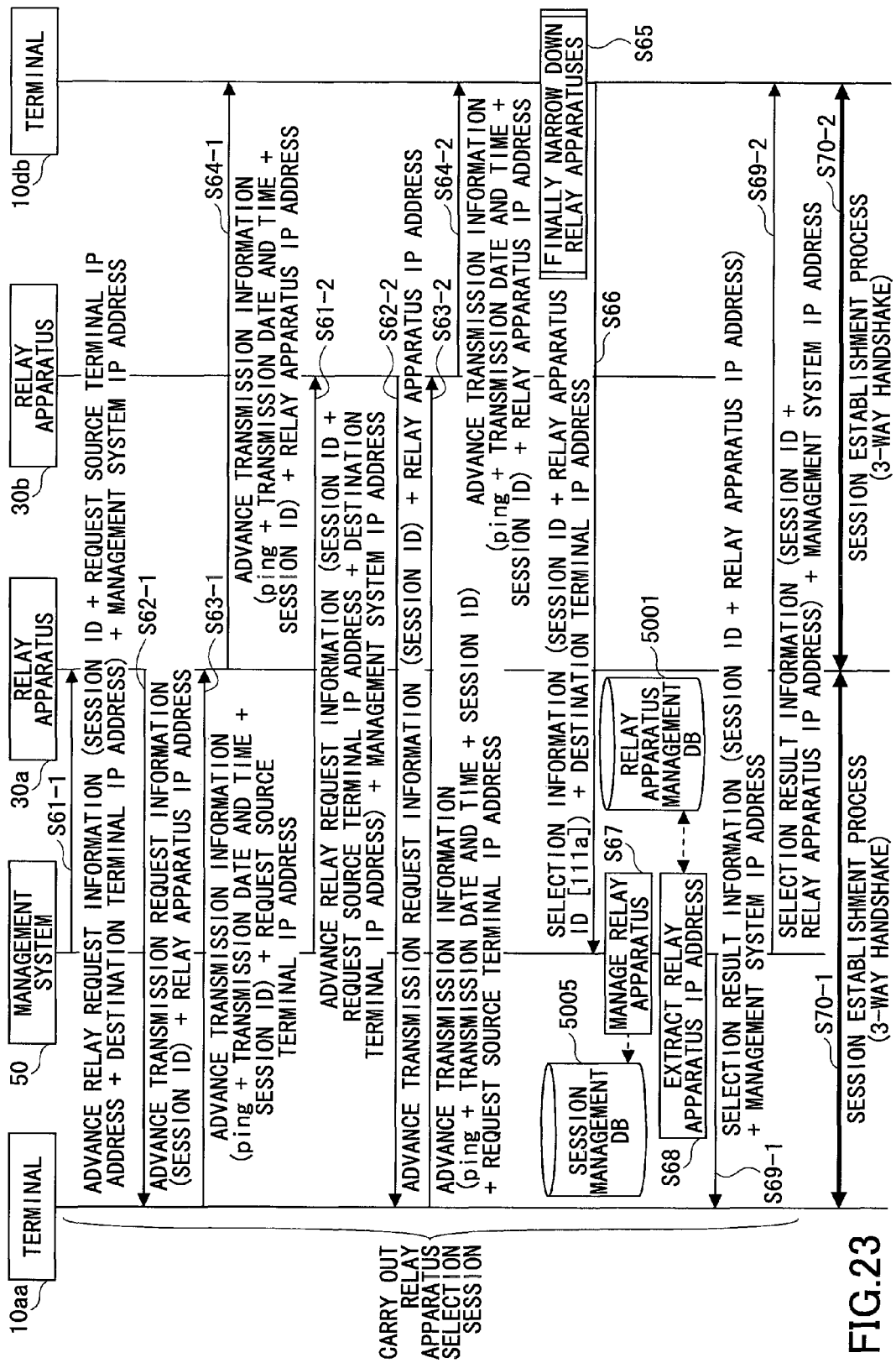
FIG. 23 shows an example of a sequence diagram of a process of selecting a single relay apparatus by the transmission terminal according to the first embodiment.
Figure 24:
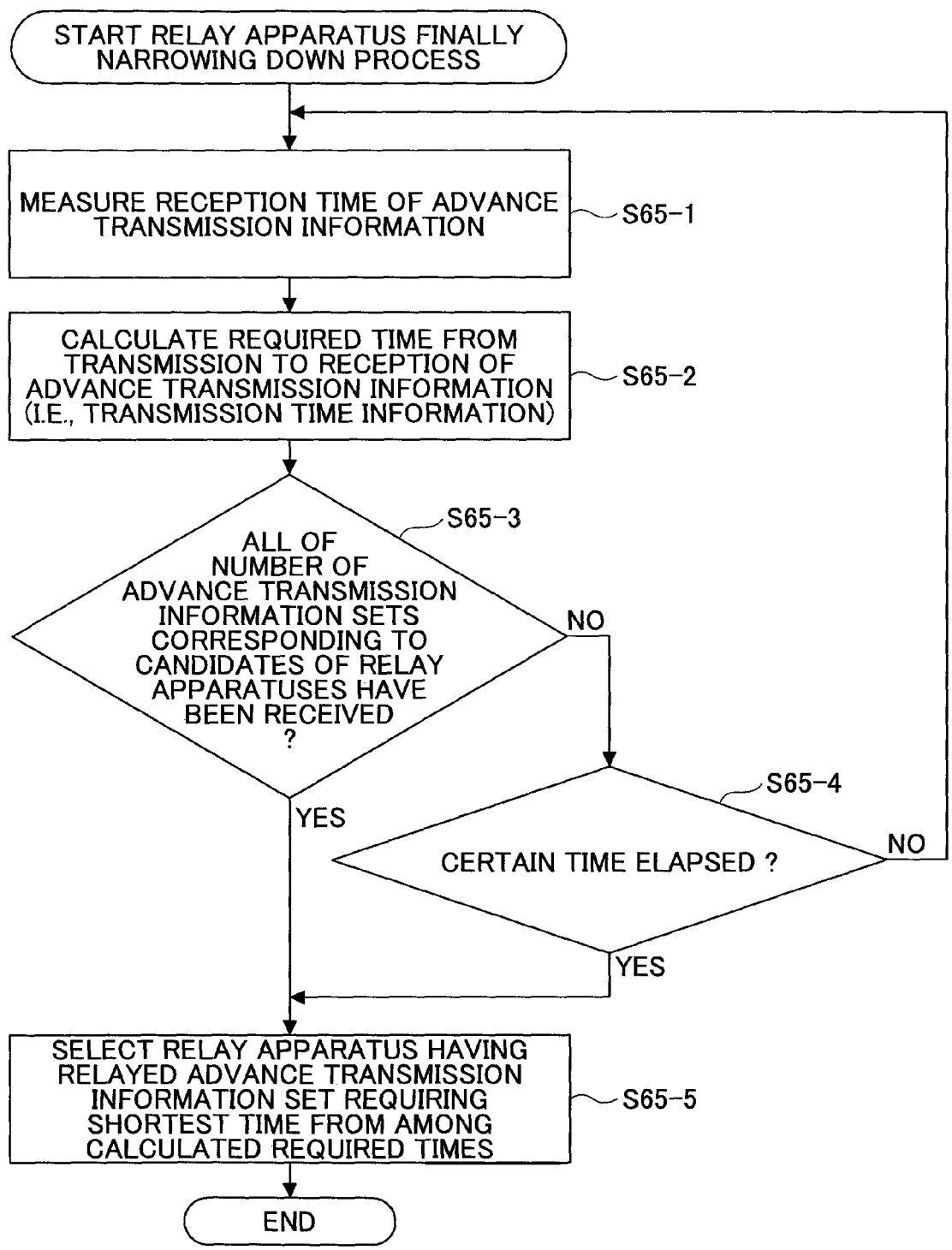
FIG. 24 shows an example of a flowchart of a process of selecting the single relay apparatus by the transmission terminal according to the first embodiment.
Figure 25:
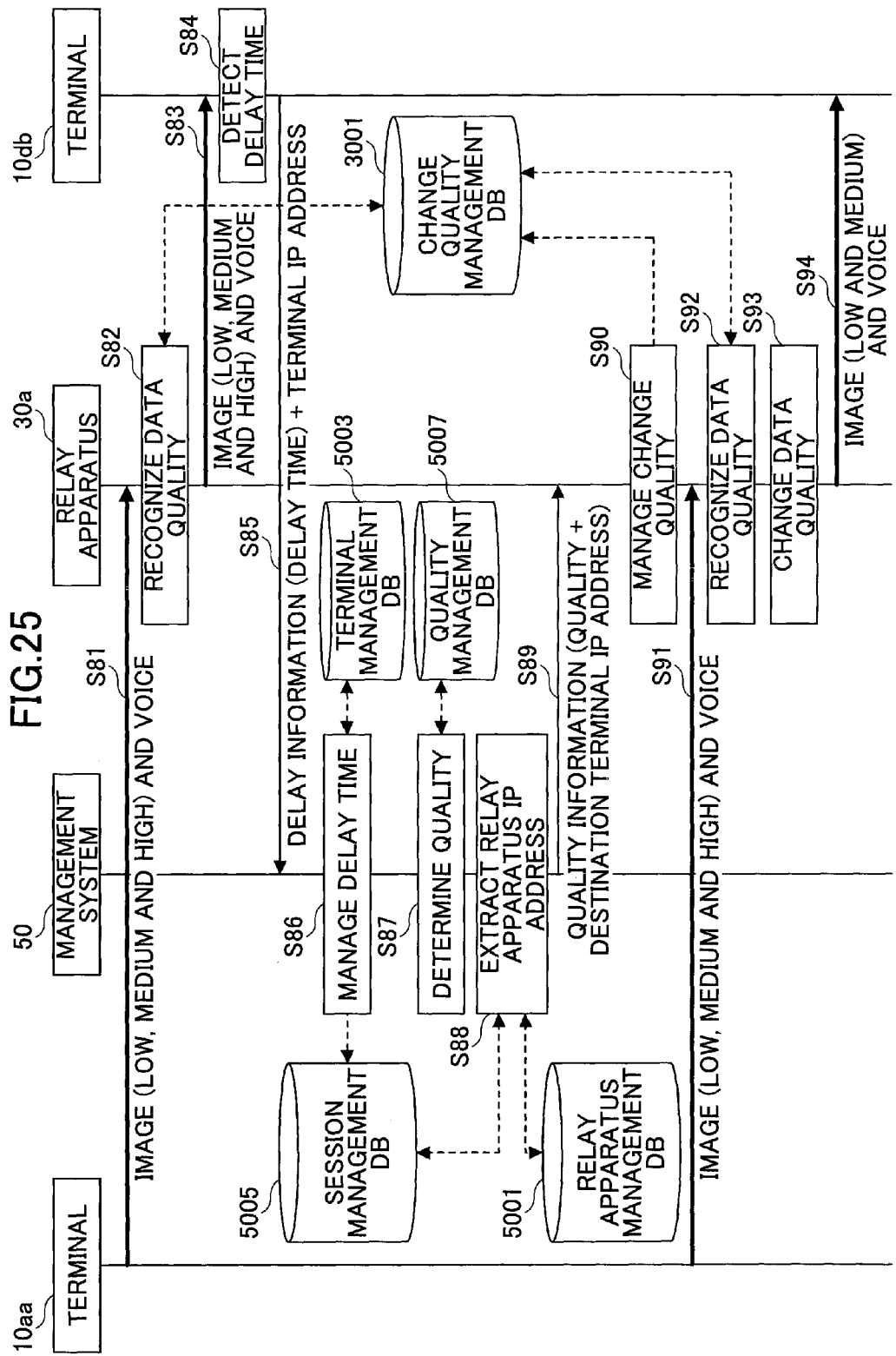
FIG. 25 shows an example of a sequence diagram of a process of transmitting image data and voice data between the transmission terminals.

Next, with reference to FIGS. 18 through 25, a processing method in the transmission system 1 according to the first embodiment will be described. It is noted that FIG. 18 is a sequence diagram showing a process of managing the information indicating the state of each of the relay apparatuses 30 transmitted to the management system 50 from the respective relay apparatuses 30. FIG. 19 is a sequence diagram showing a process of a preparation stage for starting a telephone call between plural terminals 10. FIG. 20 is a sequence diagram showing a process of session establishment. FIG. 21 is a sequence diagram showing a process of narrowing down the relay apparatuses 30. FIG. 22 is a flowchart showing the process of narrowing down the relay apparatuses 30. FIG. 23 is a sequence diagram showing a process of selecting a relay apparatus 30 by the terminal 10. FIG. 24 is a flowchart showing the process of selecting a relay apparatus 30 by the terminal 10. FIG. 25 is a sequence diagram showing a process of transmitting image data and voice data between terminals.

First, with reference to FIG. 18, a process of managing the state information indicating the states of the respective relay apparatuses 30 transmitted to the management system 50 from the respective relay apparatuses 30 will be described. First, in each of the relay apparatuses 30, the state detection part 32 shown in FIG. 7 periodically detects the operating state of the relay apparatus 30 (own apparatus) (steps S1-1 through S1-4). Then, in order to cause the management system 50 to manage the operating states of the respective relay apparatuses 30 in a real-time manner, the transmission/reception part 31 of each of the relay apparatuses 30 periodically transmits the operating state of the own apparatus to the management system 50 via the communication network 2 (steps S2-1 through S2-4). The state information includes the relay apparatus ID of the corresponding relay apparatus 30, and the operating state detected by the state detection part 32 of the relay apparatus 30 corresponding to the relay apparatus ID. It is noted that a case will be assumed where the relay apparatuses 30a, 30b and 30d are operating normally and are in "on-line" states, respectively, while the relay apparatus 30c is operating but some failure has occurred in a program for carrying out a relay operation and is in a state of "off-line".

Next, in the management system 50, the transmission/reception part 51 receives the state information sent from each of the relay apparatuses 30, and the state information is stored and managed for each of the relay apparatus IDs in the relay apparatus management DB 5001 (see FIG. 11) in the storage part 5000 via the storing/reading processing part 59 (steps S3-1 through S3-4). Thereby, as shown in FIG. 11, in the relay apparatus management table, for each of the relay apparatus IDs, any one of operating states of "on-line", "off-line" and "in failure" is stored and managed. At this time, for each of the relay apparatus IDs, the reception date and time when the state information has been received in the management system 50 is stored and managed. It is noted that in a case where the state information has not been sent from the relay apparatus 30, the field area of operating state and the field area of reception date and time on the corresponding record in the relay apparatus management table shown in FIG. 11 become blank, or show the operating state and the reception date and time at the time of the preceding reception.

Next, with reference to FIG. 19, a process of transmission/reception of various sorts of management information at a preparation stage before starting a telephone call between the terminal 10aa and the terminal 10db will be described. It is noted that in FIG. 19, various sorts of management information is transmitted and received by the management information session "sei" shown in FIG. 2.

First, when the user turns on the power supply switch 109 shown in FIG. 5, the operation input reception part 12 shown in FIG. 7 receives the power supply turning on operation, and turns on the power supply in the terminal 10 (step S20). Thereby, the transmission/reception part 11 carries out a session establishment process with the management system 50 according to a well-known communication establishment procedure according to "3-way handshake" (step S21). FIG. 20 shows the session establishment process.

As shown in FIG. 20, first, session establishment request information for requesting session establishment is transmitted from the terminal 10aa to the management system 50 (step ST1). In the session establishment request information, SYN (synchronous) that is a transmission control signal for proceeding with a process while the terminal 10aa and the management system 50 are synchronized with one another is included.

In response to reception of the SYN, the management system 50 returns reception confirmation response information to the terminal 10aa (step ST2). In the reception confirmation response information, the above-mentioned SYN, and ACK (acknowledgement) as an affirmative response, are included.

Further, when receiving the reception confirmation response information, the terminal 10aa again returns reception confirmation response information (step ST3). In the reception configuration response information sent in step ST3, ACK is included.

The management system 50 establishes a session between the terminal 10aa and the management system 50 (step ST4) by receiving the reception confirmation response information. It is noted that another terminal other than the terminal 10*aa* establishes a session with the management system 50 through the process same as that of step S21.

Next, in response to reception of the above-mentioned power supply turning on operation, the login request part 13 automatically transmits login request information indicating a login request to the management system 50 via the communication network 2 from the transmission/reception part 11 (step S22). The login request information includes the terminal ID for identifying the own terminal (terminal 10*aa*) as the request source and the password. The terminal ID and password are data having been read out from the storage part 1000 via the storing/reading processing part 19 and having been sent to the transmission/reception processing part 11. It is noted that when the login request information is transmitted to the management system 50 from the terminal 10*aa*, the management system 50 that has received the login request information can obtain the IP address of the terminal 10 that has sent the login request information.

Next, the terminal authentication part 52 in the management system 50 searches the terminal authentication management DB 5002 (see FIG. 12) of the storage part 5000 using the terminal ID and the password included in the login request information having been received from the transmission/reception part 51 as search keys, determines whether the same terminal ID and password are managed in the terminal authentication management DB 5002, and thus, carries out authentication of the terminal by determining whether the same terminal ID and password are managed (step S23). In a case where it has been determined by the terminal authentication part 52 that the login request is one sent from the terminal 10 having proper use authority since the same terminal ID and password are managed, the state management part 53 stores the terminal ID of the terminal 10*aa*, the operating state thereof, the reception date and time when the above-mentioned login request information has been received and the IP address of the terminal 10*aa* in the terminal management DB 5003 (see FIG. 13) in a manner of associating them with each other (step S24). Thereby, in the terminal management table shown in FIG. 13, the operating state "on-line", the reception date and time "2009.11.10.13:40" and the IP address "1.2.1.3" are associated with the terminal ID "01aa" and are managed.

Then, the transmission/reception part 51 of the management system 50 transmits authentication result information indicating the result of the authentication obtained by the terminal authentication part 52 to the request source terminal (terminal 10*aa*), having carried out the above-mentioned login request, via the communication network 2 (step S25). Below, description will be carried out continuously for the case where the terminal authentication part 52 has determined that the terminal having carried out the above-mentioned login request has the proper use authority.

The terminal extraction part 54 of the management system 50 searches the destination list management DB 5004 (see FIG. 14) using the terminal ID "01aa" of the request source terminal (terminal 10*aa*) having carried out the login request as a search key, and reads out and extracts the terminal IDs as candidates for a destination terminal each of which can carry out communication with the request source terminal (terminal 10*aa*) (step S26). Here, the terminal IDs "01ab", "01ba" and "01db" of destination terminals (terminals 10*ab*, 10*ba* and 10*db*) corresponding to the terminal ID "01aa" of the request source terminal (terminal 10*aa*) are extracted.

Next, the terminal state obtaining part 55 searches the terminal management DB 5003 (see FIG. 13) using these terminal IDs "01ab", "01ba" and "01db" of the candidates for a destination terminal extracted by the terminal extraction part 54 as search keys, reads the respective operating states "off-line", "on-line" and "on-line" for the above-mentioned respective terminal IDs extracted by the terminal extraction part 54, and obtains the respective operating states of the terminals 10*ab*, 10*ba* and 10*db* (step S27).

Next, the transmission/reception part 51 transmits destination state information including the terminal IDs "01ab", "01ba" and "01db" as the search keys used in step S27 and the operating states "off-line", "on-line" and "on-line" of the respective ones of the corresponding destination terminals (terminals 10*ab*, 10*ba* and 10*db*) to the request source terminal (terminal 10*aa*) via the communication network 2 (step S28). Thereby, the request source terminal (terminal 10*aa*) can obtain the respective operating states "off-line", "on-line" and "on-line" of the terminals 10*ab*, 10*ba* and 10*db* at the current time which are the candidates for a destination terminal each of which can carry out communication with the request source terminal (terminal 10*aa*).

Further, the terminal extraction part 54 of the management system 50 searches the destination list management DB 5004 (see FIG. 14) using the terminal ID "01aa" of the request source terminal (terminal 10*aa*) having carried out the login request as a search key, and extracts the terminal IDs of the other request source terminals each of which has registered the above-mentioned request source terminal (terminal 10*aa*) as a candidate for a destination terminal (step S29). In the destination list table shown in FIG. 14, the terminal IDs of the other request source terminals to be extracted are "01ab", "01ba" and "01db".

Next, the terminal state obtaining part 55 of the management system 50 searches the terminal management DB 5003 (see FIG. 13) using the terminal ID "01aa" of the request source terminal (terminal 10*aa*) having carried out the above-mentioned login request, and obtains the operating state of the request source terminal (terminal 10*aa*) having carried out the login request (step S30).

Next, the transmission/reception part 51 transmits destination state information including the terminal ID "01aa" of the request source terminal (terminal 10*aa*) and the operating state "on-line" thereof obtained in step S30 to the terminals 10*ba* and 10*db* each of which has the operating state of "on-line" in the terminal management DB 5003 (see FIG. 13) among the terminals 10*ab*, 10*ba* and 10*db* having the terminal IDs 01ab, 01ba and 01db extracted in step S29 (step S31-1, S31-2). It is noted that when the transmission/reception part 51 is to transmit the destination state information to the terminals 10*ba* and 10*db*, the transmission/reception part 51 reads the IP addresses of these terminals managed in the terminal management table shown in FIG. 13 based on the respective terminal IDs "01ba" and "01db". Thereby, it is possible to inform the respective ones of the destination terminals (terminals 10*ba* and 10*db*) each of which can carry out communication with the request source terminal (terminal 10*aa*) having carried out the login request as the destination, of the terminal ID "01aa" and the operating state "on-line" of the request source terminal (terminal 10*aa*) having carried out the above-mentioned login request.

On the other hand, also in the other terminal, the same as the above-mentioned step S21, when the user turns on the power supply switch 109 shown in FIG. 6, the operation input reception part 12 shown in FIG. 7 receives the power supply turning on operation, and the processes the same as those of steps S22 through S31-1 and S31-2 mentioned above are carried out. Therefore, the description therefor will be omitted.

Next, with reference to FIG. 21, the process of narrowing down the relay apparatuses 30 will be described. It is noted that in FIG. 21, the various sorts of management information are transmitted and received wholly by the management information session "sei" shown in FIG. 2. Further, according to the first embodiment, the request source terminal (terminal 10aa) can carry out a telephone call with at least one of the terminals (10ba and 10db) having the operating state of "online" among the terminals 10 of the candidates for a destination, according to the state information received in the above-mentioned step S28. Below, description will be carried out for a case where the user of the request source terminal (terminal 10aa) has selected to carry out a telephone call with the destination terminal (terminal 10db).

First, when the user presses the operating button 108 to select the terminal 10db, the operation input reception part 12 shown in FIG. 7 receives the request for starting a telephone call with the destination terminal (terminal 10db) (step S41). Then, the transmission/reception part 11 of the request source terminal (terminal 10aa) transmits start request information including the terminal ID "01aa" of the terminal 10aa and the terminal ID "01db" of the destination terminal (terminal 10db) and indicating an intention to start a telephone call to the management system 50 (step S42). Thereby, the transmission/reception part 51 of the management part 50 receives the start request information, and can obtain the IP address "1.2.1.3" of the request source terminal (terminal 10aa) (transmission source).

Then, the state management part 53 changes the field area of operating state in the records of the above-mentioned terminal ID "01aa" and terminal ID "01db", respectively, in the terminal management DB 5003 (see FIG. 13), into "on a telephone call", based on the terminal ID "01aa" of the request source terminal (terminal 10aa) and the terminal ID "01db" of the destination terminal (terminal 10db) included in the start request information (step S43). It is noted that in this state, although a telephone call has not yet been started between the request source terminal (terminal 10aa) and the destination terminal (terminal 10db), the request source terminal (terminal 10aa) and the destination terminal (terminal 10db) thus enter the state of "on a telephone call". Therefore, when another terminal intends to carry out a telephone call with the request source terminal (terminal 10aa) or the destination terminal (terminal 10db), a notification sound or display indicating the "on a telephone call" state is output.

Next, a process of carrying out a session for selecting a relay apparatus 30 will be described. First, the selection session ID generating part 56a shown in FIG. 9 generates a selection session ID used to carry out a session for selecting a relay apparatus 30 (step S44). Then, the session management part 57 stores the selection session ID "se1" generated in step S44, the terminal ID "01aa" of the request source terminal (terminal 10aa) and the terminal ID "01db" of the destination terminal (terminal 10db) in a manner of associating them with each other in the session management DB 5005 (see FIG. 15) of the storage part 5000 and manages them (step S45).

Next, the preliminary narrowing down part 56 of the management system 50 shown in FIG. 7 carries out preliminary narrowing down the relay apparatuses 30 for relaying a telephone call between the request source terminal (terminal 10aa) and the destination terminal (terminal 10db) based on the relay apparatus management DB 5001 and the relay possible apparatus management DB 5006 (step S46).

With reference to FIGS. 9 and 22, the process in step S46 will now be described in detail. First, the terminal ID obtaining part 56b shown in FIG. 9 extracts and obtains the terminal ID "01aa" of the request source terminal (terminal 10aa) and the terminal ID "01db" of the destination terminal included in the start request information, from the start request information sent from the request source terminal (terminal 10aa) (step S46-1).

Next, the preliminary selection part 56c searches the relay possible apparatus management DB 5006 based on the respective ones of the terminal ID "01aa" of the request source terminal (terminal 10aa) and the terminal ID "01db" of the destination terminal (terminal 10db) obtained by the terminal ID obtaining part 56b, and extracts the common relay apparatus IDs ("111a" and "111b") from among the relay apparatus IDs corresponding to the respective terminal IDs (step S46-2). Further, the preliminary selection part 56c selects the relay apparatus IDs ("111a" and "111b") of the relay apparatuses 30 which have the operating state of "online" in the relay apparatus management DB 5001 (see FIG. 11) from among the relay apparatuses 30a and 30b of the extracted relay apparatus IDs "111a" and "111b" (step S46-3). Thus, the management system 50 can narrow down to the two or more relay apparatuses before finally narrowing down to a single relay apparatus.

When the narrowing down process in step S46 is thus finished, the transmission/reception part 51 shown in FIG. 7 transmits relay apparatus narrowing down information, for informing the destination terminal (terminal 10db) via the communication network 2 of the narrowed down number of the relay apparatuses 30, to the destination terminal (terminal 10db) (step S47). The relay apparatus narrowing down information includes the number "2" of the relay apparatuses 30a and 30b thus narrowed down in step S46, the terminal ID "01aa" of the request source terminal (terminal 10aa) and the above-mentioned selection session ID "se1". Thereby, the terminal 10db can understand, in execution of the selection session of ID "se1", the number of the relay apparatuses 30 and the terminal from which the request of starting a telephone call has been carried out, and also can understand the IP address "1.1.1.2" of the management system 50 that is the transmission source of the relay apparatus narrowing down information.

Then, the transmission/reception part 11 of the terminal 10db transmits reception completion information indicating that the above-mentioned relay apparatus narrowing down information has been received, to the management system 50 via the communication network 2 (step S48). The reception completion information includes the session ID "se1". Thereby, the management system 50 can understand that the transmission of the number of the relay apparatuses 30 carried out in the session ID "se1" has been finished, and can know the IP address "1.3.2.4" of the destination terminal (terminal 10db) that is the transmission source.

Next, with reference to FIGS. 23 and 24, a process of the destination terminal (terminal 10db) selecting a relay apparatus 30 will be described. It is noted that in FIG. 23, various sorts of management information are wholly transmitted and received in the management information session "sei" shown in FIG. 2.

First, the management system 50 transmits advance relay request information that requests relaying in advance, to each of the relay apparatuses 30a and 30b narrowed down in step S46 (steps S61-1, S61-2), before a telephone call in a TV conference is started. The advance relay request information includes the session ID "se1", the IP address "1.2.1.3" of the request source terminal (terminal 10aa) and the IP address "1.3.2.4" of the destination terminal (terminal 10db). Thereby, each of the relay apparatuses 30a and 30b can understand which selection session is relevant, which is the request source terminal and which is the destination terminal, and also can know the IP address "1.1.1.2" of the management system 50 that is the transmission source of the advance relay request information.

Next, each of the relay apparatuses 30a and 30b transmits, from the transmission/reception part 31, advance transmission request information, indicating an intention of requesting the request source terminal (terminal 10aa) to transmit advance transmission information including a ping (Packet Internet Groper) described later to the respective one of the relay apparatuses 30a and 30b itself before a start of a telephone call, to the request source terminal (terminal 10aa) understood in steps S61-1 and S61-2, via the communication network 2 (steps S62-1, S62-2). The advance transmission request information includes the session ID "se1". Thereby, the request source terminal (terminal 10aa) can understand it is being requested to transmit the advance transmission information to each of the relay apparatuses 30a and 30b in the process of selecting a relay apparatus 30 carried out in the session ID "se1", and can know the IP addresses "1.2.1.2" and "1.2.2.2" of the relay apparatuses 30a and 30b that are the transmission sources of the advance transmission request information.

Thus, the IP address of the destination terminal 10db is not supplied to the request source terminal 10aa directly from the management system 50. For example, the IP address of the destination terminal 10db is supplied to the relay apparatus 30a as in step S61-1 and the relay apparatus 30a requests the request source terminal 10aa to transmit the advance transmission information to the own apparatus (the relay apparatus 30a) as in step S62-1. Not notifying one terminal 10 of the IP address of another terminal 10 is for ensuring security.

Next, the request source terminal (terminal 10aa) transmits the advance transmission information to each of the relay apparatuses 30a and 30b via the communication network 2 from the transmission/reception part 11 (steps S63-1, S63-2). The advance transmission information is information used for measuring a time required from a transmission by the request source terminal (terminal 10aa) to a reception by the destination terminal (terminal 10db), as a result of it being transmitted to the destination terminal (terminal 10db) via each of the relay apparatuses 30a and 30b instead of image data and voice data, in advance to transmission of the actual image data and voice data. Further, the advance transmission information includes ping, used to determine that the request source terminal (terminal 10aa), the relay apparatuses 30a and 30b and the destination terminal (terminal 10db) are connected in a manner of being able to carry out mutual communication, transmission date and time when the advance transmission information has been transmitted from the request source terminal (terminal 10aa) and the session ID "se1". Thereby, each of the relay apparatuses 30a and 30b can understand that in execution of the session of the selection session ID "se1", the advance transmission information has been transmitted, and also can understand the IP address "1.2.1.3" of the request source terminal (terminal 10aa) that is the transmission source of the advance transmission information.

Next, each of the relay apparatuses 30a, 30b relays the advance transmission information to the IP address "1.3.2.4" of the destination terminal (terminal 10db) included in the advance relay request information received in steps S61-1, S61-2 (steps S64-1, S64-2). Thereby, the destination terminal (terminal 10db) can understand that in execution of the session of the session ID "se1", the advance transmission information has been sent, and also can know the IP addresses "1.2.1.2" and "1.2.2.2" of the relay apparatuses 30a, 30b that are the transmission sources (relay sources) of the advance transmission information.

Next, the finally narrowing down part 16 of the destination terminal (terminal 10db) finally narrows down to a single relay apparatus 30 which is to relay image data and voice data in a telephone call of a TV conference, based on the advance transmission information (step S65).

With reference to FIGS. 8 and 24, the process in step S65 will be descried in further detail. First, the measurement part 16a of the finally narrowing down part 16 measures the reception dates and times when respective advance transmission information sets, relayed by the respective relay apparatuses 30a, 30b, have been received by the transmission/reception part 11 of the terminal 10db (step S65-1). Next, the calculation part 16b calculates the required times from the transmissions to the receptions of the respective advance transmission information sets, for which the reception dates and times have been measured as mentioned above, based on the differences between the reception dates and times and the transmission dates and times included in the respective advance transmission information sets (step S65-2). Next, the final selection part 16c determines whether in execution of the session of the session ID "se1", all of the advance transmission information sets, corresponding to the number "2" of the relay apparatuses which are the candidates, have been received (step S65-3). When all of the advance transmission information sets have not yet been received (NO), the final selection part 16c determines whether a certain time (here, 1 minute, for example) has elapsed from when the terminal 10db has received the advance transmission information set most recently (step S65-4). In a case where the certain time has not yet elapsed (NO), step S65-1 is returned to. On the other hand, in a case where all of the advance transmission information sets have been received (step S65-3 YES) or the certain time has elapsed (step S65-4 YES), the final selection part 16c selects one of the relay apparatuses 30 which has relayed the advance transmission information set having the shortest required time among the required times calculated until now by the calculation part 16b (step S65-5). It is noted that description of the first embodiment will be carried out for a case where the relay apparatus 30a is selected as a result of it being determined that the advance transmission information set relayed by the relay apparatus 30a has the time required from the transmission to the reception shorter than that of the advance transmission information set relayed by the relay apparatus 30b.

Next, the destination terminal (terminal 10db) transmits selection information indicating having selected the relay apparatus 30a to the management system 50 via the communication network 2 from the transmission/reception part 11 (step S66). The selection information includes the session ID "se1" and the relay apparatus ID "111a" of the selected relay apparatus 30a. Thereby, the management system 50 can understand that in execution of the session of the session ID "se1", the relay apparatus 30a has been selected, and also can know the IP address "1.3.2.4" of the destination terminal (terminal 10db) that is a transmission source of the selection information.

Next, the session management part 57 of the management system 50 stores the relay apparatus ID "111a" of the finally selected single relay apparatus 30a in the field area of relay apparatus on the record including the session ID "se1" in the session management table of the session management DB 5005 (see FIG. 15) and manages it (step S67).

Further, the IP address extraction part 61 searches the relay apparatus management DB 5001 based on the relay apparatus ID "111a" of the selected single relay apparatus 30a, and extracts the IP address "1.2.1.2" of the corresponding relay apparatus 30a (step S68).

Then, the transmission/reception part 51 of the management system 50 transmits selection result information to the request source terminal (terminal 10aa) via the communication network 2 for reporting the result of finally selecting the single relay apparatus (step S69-1). The selection result information includes the session ID "se1" and the IP address "1.2.1.2" of the relay apparatus 30a extracted in step S68. Similarly, the transmission/reception part 51 of the management system 50 transmits the selection result information to the destination terminal (terminal 10db) via the communication network 2 for reporting the result of finally selecting the single relay apparatus (step S69-2).

Next, the request source terminal (terminal 10aa) carries out a communication establishment procedure by the above-described "3-way handshake" based on the IP address "1.2.1.2" of the relay apparatus 30a of the selection result information, and carries out a session establishment process with the relay apparatus 30a (step S70-1). Similarly, the destination terminal (terminal 10db) carries out a communication establishment procedure by the above-described "3-way handshake" based on the IP address "1.2.1.2" of the relay apparatus 30a of the selection result information, and carries out a session establishment process with the relay apparatus 30a (step S70-2). Thereby, the request source terminal (terminal 10aa) and the destination terminal (terminal 10db) can carry out transmission and reception of content data with one another via the relay apparatus 30a.

It is noted that in step S47 mentioned above, the management system 50 transmits the relay apparatus narrowing down information to the destination terminal (terminal 10db), and then, the destination terminal (terminal 10db) carries out the process of selecting the relay apparatus (step S65) through steps S48 through S64-1, S64-2. However, it is not necessary to be limited to this method. Instead, in step S47, the management system 50 may transmit the relay apparatus narrowing down information rather to the request source terminal (terminal 10aa), and thus, after that, up to steps S64-1 and S64-2, the transmission source and destination may be replaced with one another between the request source terminal (terminal 10aa) and the destination terminal (terminal 10db) for transmitting each information set. Thus, instead of step S65, the request source terminal (terminal 10aa) may carry out the process of selecting the relay apparatus. Further, instead of step S66, the request source terminal (terminal 10aa) may carry out transmission of the selection information.

Next, with reference to FIGS. 7 and 25, a process of transmitting image data and voice data between the request source terminal and the destination terminal for the purpose of carrying out a telephone call of a TV conference will be described. It is noted that since processes of transmission and reception of image data and voice data, detection of a delay time described later and so forth are identical between transmission of image data and voice data in one direction from the terminal 10aa to the terminal 10db and transmission of image data and voice data in the reverse direction from the terminal 10db to the terminal 10aa, description will be carried out only for the communication in the one direction and description for the communication in the reverse direction will be omitted.

First, the request source terminal (terminal 10aa) transmits image data of an object photographed by the photographing part 14 and voice data of voice audio input by the voice input part 15a to the relay apparatus 30a via the communication network 2 from the transmission/reception part 11 through the image and voice data session "sed" shown in FIG. 2 (step S81). It is noted that according to the first embodiment, image data of high image quality including the three resolutions of the low resolution, the medium resolution and the high resolution, and the voice data are transmitted. Thus, the relay apparatus 30a receives the image data of the three resolutions and the voice data from the transmission/reception part 31. Then, the data quality determination part 33 searches the change quality management DB 3001 (see FIG. 10) using the IP address "1.3.2.4" of the destination terminal (terminal 10db), extracts the corresponding image quality of image data to relay, and thus, recognizes the image quality of image data to relay (step S82). In this case, assuming that the determined image quality of image data is "high image quality", it is the same as the image quality of the image data received by the transmission/reception part 31. Therefore, the relay apparatus 30a transfers the image data of the image quality as it is and the voice data of the voice quality as it is to the destination terminal (terminal 10db) through the image and voice data session "sed" (step S83). Thus, the destination terminal (terminal 10db) receives by the transmission/reception part 11 the image data of high image quality including the three resolutions of the low resolution, medium resolution and high resolution, and the voice data. Then, the display control part 17 of the destination terminal (terminal 10db) can combine the image data of the three resolutions, display the resulting image on the display device 120, and the voice output part 15b can output the voice audio based on the received voice data.

Next, the delay detection part 18 of the terminal 10db detects a delay time of reception of image data received by the transmission/reception part 11 at certain time intervals (for example, every second) (step S84). It is noted that description will be carried out below for a case where the thus-detected delay time is 200 ms. The detection of a delay time of reception of image data may be carried out by, for example, information indicating transmission date and time when the image data is transmitted from the transmission source terminal being attached to the image data, and the transmission destination terminal calculating the delay time based on the difference between the transmission and reception of the received image data, using the information indicating transmission date and time attached to the received image data and reception date and time when the received image data is received in the transmission destination terminal.

The transmission/reception part 11 of the destination terminal (terminal 10db) transmits delay information indicating the delay time "200 ms" to the management system 50 via the communication network 2 through the management information session "sei" shown in FIG. 2 (step S85). Thereby, the management system 50 can know the delay time and also know the IP address "1.3.2.4" of the terminal 10db that is the transmission source of the delay information.

Next, the delay time management part 60 of the management system 50 searches the terminal management DB 5003 (see FIG. 13) using the IP address "1.3.2.4" of the above-mentioned destination terminal (terminal 10db) as a search key, extracts the corresponding terminal ID "01db", stores the delay time "200 ms" indicated by the above-mentioned delay information at the field area of delay time on the record of the above-mentioned terminal ID "01db" in the session management table of the session management DB 5005 (see FIG. 15), and manages it (step S86)

Next, the quality determination part 58 searches the quality management DB 5007 (see FIG. 17) using the above-mentioned delay time "200 ms" as a search key, extracts the corresponding image quality "medium image quality" of image data, and thus determines the image quality to be "medium image quality" (step S87).

Next, the transmission/reception part 51 obtains the relay apparatus ID "111a" associated with the above-mentioned terminal ID "01db" in the session management table of the session management DB (see FIG. 15), searches the relay apparatus management DB 5001 (see FIG. 11) using the relay apparatus ID "111a" as a search key, and extracts the IP address "1.2.1.2" of the corresponding relay apparatus 30a (step S88). Then, the transmission/reception part 51 transmits quality information indicating the image quality "medium image quality" determined in step S87 to the relay apparatus 30a via the communication network 2 through the management information session "sei" (step S89). The quality information includes the IP address "1.3.2.4" of the destination terminal (terminal 10db) used as the search key in step S86. Thereby, the change quality management part 34 in the relay apparatus 30a stores the IP address "1.3.2.4" of the terminal 10 (here, the terminal 10db) as the transmission destination and the image quality "medium image quality" of image data to be relayed, in the change quality management DB 3001 (see FIG. 10) in a manner of associating them with one another, and manages them (step S90).

Next, the terminal 10aa continuously transmits image data of high image quality including the three resolutions of the low resolution, medium resolution and high resolution and voice data to the relay apparatus 30a through the image and voice data session "sed", the same as step S81 mentioned above (step S91). Then, the same as step S82 mentioned above, the data quality determination part 33 of the relay apparatus 30a searches the change quality management DB 3001 (see FIG. 10) using the IP address "1.3.2.4" of the destination terminal (terminal 10db) as a search key, extracts the corresponding image quality "medium image quality" to relay, and thus recognizes the quality of, an image of image data to relay (step S92). In this example, the determined image quality of image data is "medium image quality" which is lower than the image quality "high image quality" of the image data received by the transmission/reception part 31. Therefore, the data quality changing part 35 reduces the image quality of image data from "high image quality" to "medium image quality", and thus changes the quality of the image of the image data (step S93).

Then, the transmission/reception part 31 transmits the image data for which the image quality has been thus changed to "medium image quality" and the voice data for which the voice quality has not been changed, to the terminal 10db via the communication network 2 through the image and voice data session "sed" (step S94). Thereby, the transmission/reception part 11 of the destination terminal (terminal 10db) receives the image data of medium image quality including the two resolutions of the low resolution and medium resolution and the voice data. Then, the display control part 17 can combine the image data of the two resolutions and display the resulting image on the display device 120, and also, the voice output part 15b can output the voice audio based on the voice data.

Thus, in the case where the delay in reception occurs in the destination terminal (terminal 10db) that receives image data, the relay apparatus 30a changes (reduces) the quality of the image to reduce the delay, and thus, it is possible to prevent the persons participating the TV conference from feeling that something is wrong.

<<Main Advantageous Effects of Embodiment>>

As described above, according to the first embodiment, based on the position at which the firewall is installed in the communication network 2 and the type of the firewall, the relay apparatuses 30 that can be used are previously determined for each of the terminals 10. Then, from among the plural relay apparatuses 30, narrowing down is carried out to two or more relay apparatuses 30 each of which can be used in common with the request source terminal and the destination terminal (preliminary narrowing down). Next, before image data and voice data are actually transmitted between the plural terminals 10, the advance transmission information is transmitted as a trial instead of the image data and voice data. Thereby, it is possible to advantageously narrow down to the single relay apparatus 30 which can relay the actual transmission information soonest (finally narrowing down).

Further, according to the first embodiment, when the relay apparatuses 30 are narrowed down, narrowing down is carried out from among the relay apparatuses 30 each having the operating state of on-line. Therefore, it is possible to narrow down to candidates for a relay apparatus 30 further based on the actual environments of the communication network 2.

Second Embodiment

Figure 26:
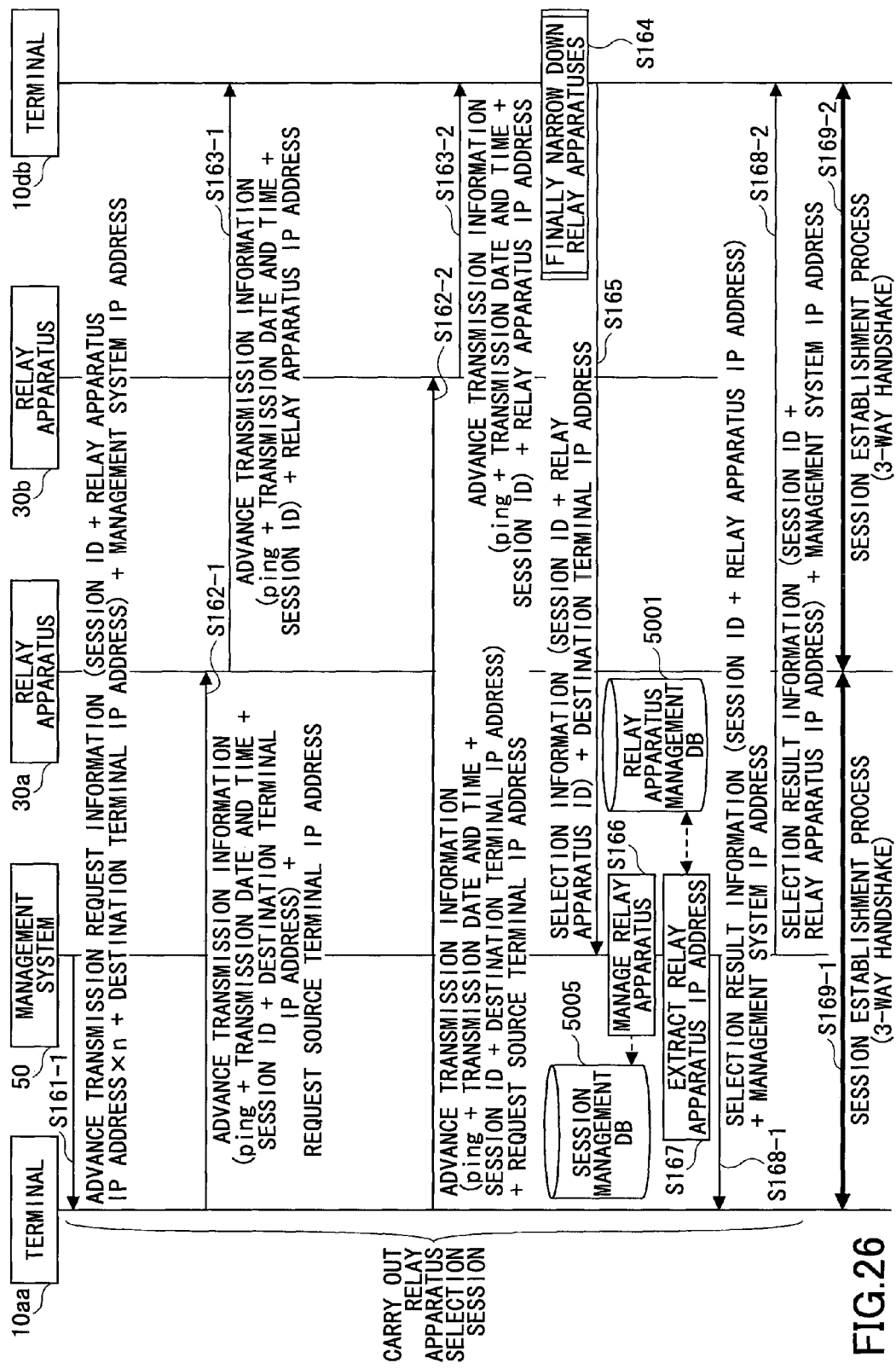
FIG. 26 shows an example of a sequence diagram of a process of selecting the single relay apparatus by the transmission terminal according to a second embodiment of the present invention.

Next, a second embodiment of the present invention will be described with reference to FIG. 26. FIG. 26 is a sequence diagram showing a process of the terminal's selecting the relay apparatus's according to the second embodiment of the present invention. It is noted that the second embodiment is different from the first embodiment in that only the processes and operations in FIG. 26 and FIG. 23, respectively, are different, and therefore, as shown below, only the points of difference in the processes and operations will be described.

<<Processes and Operations in Embodiment>>

In steps S61-1, S62-1, S61-2 and S62-2 in FIG. 23 of the first embodiment, the management system 50 requests via each of the relay apparatuses (30a, 30b) the request source terminal (terminal 10aa) to transmit the advance transmission information. In contrast thereto, according to the second embodiment, the management system 50 directly requests the request source terminal (terminal 10aa) to transmit the advance transmission information. In this point, the second embodiment is different from the first embodiment.

That is, according to the second embodiment, as shown in FIG. 26, first, the management system 50 transmits the advance transmission request information to the request source terminal 10aa (step S161-1). The advance transmission request information in this case includes the session ID "se1", the IP addresses "1.2.1.2" and "1.2.2.2" of the respective ones of the preliminarily narrowed down relay apparatuses 30a, 30b, and the IP address "1.3.2.4" of the destination terminal (terminal 10db). Thereby, the request source terminal (terminal 10aa) can understand which of the selection sessions is relevant, which are the relay apparatuses 30 of the preliminary narrowed down candidates to be finally narrowed down, and what is the IP address of the destination terminal (terminal 10db); and also, know the IP address "1.1.1.2" of the management system 50 that is the transmission source of the advance transmission request information.

Next, the request source terminal (terminal 10aa) transmits the advance transmission information to the relay apparatuses 30a, 30b (steps S162-1, S162-2). The advance transmission information includes, the same as steps S63-1, S63-2 in the first embodiment described above, not only ping, the transmission date and time when the advance transmission information has been transmitted from the above-mentioned request source terminal (terminal 10aa) and the session ID "se1", but also the IP address "1.3.2.4" of the destination terminal (terminal 10db). Thereby, the relay apparatuses 30a, 30b can understand that in execution of the session of the session ID "se1", the advance transmission information has been sent, also know the IP address "1.2.1.3" of the request source terminal (terminal 10*aa*) that is the transmission source of the advance transmission information, and further know the IP address "1.3.2.4" of the destination terminal (10*db*) that is the transmission destination of the advance transmission information. Therefore, each of the relay apparatuses 30*a*, 30*b* can transmit (or relay) the advance transmission information to the obtained IP address of the destination terminal (terminal 10*db*).

It is noted that the processes in steps S163-1, S163-2 through S169-1, S169-2 are the same as those of steps S64-1, S64-2 through S70-1, S70-2 of FIG. 23 in the first embodiment, and therefore, duplicate description will be omitted.

<<Main Advantageous Effects of Embodiment>>

Thus, as described above, the second embodiment has the same main advantageous effects as those of the first embodiment described above.

However, according to the second embodiment, the IP address of the destination terminal is provided to the request source terminal, and in this point, the second embodiment is inferior to the first embodiment from the viewpoint of security. However, for example, in the first embodiment, in a case where a firewall is installed to ensure confidentiality of the LAN 2*a* shown in FIG. 1, there may be a case where it is not possible to send the advance transmission request information to the request source terminal (terminal 10*aa*) in step S62-2 from the relay apparatus 30*b*. In contrast thereto, according to the second embodiment, transmission of the advance transmission request information to the terminal 10*aa* is not carried out from the relay apparatus 30. Therefore, the problem that the advance transmission request information cannot be sent does not occur. It is noted that in this case, the management system 50 is located in the communication network 2 in the outside of the firewall. However, as shown in FIG. 19, the connection has been already established between the terminal 10*aa* and the management system 50, and therefore, the management system 50 can send the advance transmission request information to the terminal 10*aa* passing through the firewall.

[Supplementation of Embodiments]

Each of the relay apparatuses 30, the management system 50, the program providing system 90 and the maintenance system 100 in each of the first and second embodiments may be realized by a single computer, or may be realized by plural computers where respective parts (or functions) are divided and are arbitrarily allocated to the plural computers. Further, in a case where the program providing system 90 is realized by a single computer, a program to be transmitted by the program providing system 90 may be transmitted as having been divided into plural modules, or may be transmitted as not having been divided into plural modules. Further, in a case where the program providing system 90 is realized by plural computers, divided plural modules may be transmitted by the plural computers, respectively.

Further, recording media such as CD-ROMs storing the program for the terminal, the program for the relay apparatus and the program for transmission management, the HD 204 storing these programs, and the program providing system 90 including the HD 204 are used in a case where the program for the terminal, the program for the relay apparatus and the program for transmission management are provided to users or such as program products in the home country or aboard.

Further, in the above-mentioned embodiments, quality of image data is managed in particular using resolution of an image of image data as one example of quality of an image of image data relayed by the relay apparatus 30, using the change quality management table shown in FIG. 10 and the quality management table shown in FIG. 17. However, quality of data is not limited thereto, and as other examples of quality of data, data may be managed in particular using a depth (for example, color depth) of image quality of image data, a sampling frequency in voice data, a bit length in voice data, or such. Further, voice data may be transmitted as having been divided into three resolutions (i.e., high resolution, medium resolution and low resolution).

Further, in FIGS. 11, 13 and 15, the reception dates and times are managed. However, it is not necessary to be limited thereto, and it may be sufficient that at least the reception times from among the reception dates and times are managed.

Further, in the above-mentioned embodiments, the IP addresses of the relay apparatuses in FIG. 11 and the IP addresses of the terminals in FIG. 13 are managed. However, it is not necessary to be limited thereto, and as long as relay apparatus identification information for identifying the relay apparatus 30 in the communication network 2 or terminal identification information for identifying the terminal 10 in the communication network 2 is used, a FQDN (Fully Qualified Domain Name) thereof may be managed. In this case, the IP address corresponding to the FQDN will be obtained from a well-known DNS (Domain Name System) server. It is noted that "relay apparatus identification information for identifying the relay apparatus 30 in the communication network 2" may also be expressed as "relay apparatus connecting destination information indicating a connecting destination for the relay apparatus 30 in the communication network 2" or "relay apparatus destination information indicating a destination for the relay apparatus 30 in the communication network 2". Similarly, "terminal identification information for identifying the terminal 10 in the communication network 2" may also be expressed as "terminal connecting destination information indicating a connecting destination for the terminal 10 in the communication network 2" or "terminal destination information indicating a destination for the terminal 10 in the communication network 2".

Further, in the above-mentioned embodiments, as an example of the transmission system 1, a case of a TV conference system has been described. However, it is not necessary to be limited thereto, and an example of the transmission system 1 may be a telephone system for IP (Internet Protocol) telephone, Internet telephone, or such. Further, the transmission system 1 may be an automotive navigation system. In this case, one of the terminals 10 corresponds to an automotive navigation apparatus mounted in one automobile, and another of the terminals 10 corresponds to a management terminal or a management server in a management center which manages the automotive navigation system, or an automotive navigation apparatus mounted in another automobile. Further, the transmission system 1 may be a communication system for cellular phones. In this case, the terminals correspond to cellular phones.

Further, in the above-mentioned embodiments, as one example of content data, image data and voice data have been described. However, it is not necessary to be limited thereto. An example of content data may be touch data. In this case, a feeling occurring when a user touches something on the side of one of the terminals is transmitted to the side of another of the terminals. Further, content data may be smell data. In this case, a smell occurring on the side of one of the terminals 10 is transmitted to the side of another of the terminals 10. Further, it may be sufficient that content data is at least any one of image data, voice data, touch data and smell data.

Further, in the above-mentioned embodiments, the case where the TV conference is conducted by using the transmission system 1 has been described. However, it is not necessary to be limited thereto. The transmission system 1 may be used for a meeting, a common conversation between family members, friends or such, or may be used for submitting information in one direction.

Although this invention has been described in detail with reference to certain embodiments, variations and modifications exist within the scope and spirit of the invention as described and defined in the following claims.

The present application is based on Japanese Priority Applications No. 2010-237672 filed Oct. 22, 2010, and No. 2011-173751 filed Aug. 9, 2011, the entire contents of which are hereby incorporated by reference.

What is claimed is:

1. A transmission management system which assists in finally narrowing down to a single relay apparatus from among plural of the relay apparatuses for relaying content data to be transmitted between plural transmission terminals via a communication network, comprising:
  a relay possible apparatus management part configured to manage, for items of terminal identification information for identifying the transmission terminals, respectively, relay apparatus identification information for identifying the relay apparatuses, each of which is capable of relaying the content data transmitted from one of the transmission terminals;
  an identification information reception part configured to receive, from the transmission terminal acting as a request source, one of the items of the terminal identification information for identifying the transmission terminal acting as the request source and another of the items of the terminal identification information for identifying the transmission terminal acting as a destination; and
  a preliminary narrowing down part configured to narrow down to two or more of the relay apparatuses before finally narrowing down to the single relay apparatus by searching the relay possible apparatus management part based on the one received item of the terminal identification information for identifying the transmission terminal acting as the request source and the other received item of the terminal identification information for identifying the transmission terminal acting as the destination, and extracting items of the relay apparatus identification information each being common to the one received item of the terminal identification information for identifying the transmission terminal acting as the request source and the other received item of the terminal identification information for identifying the transmission terminal acting as the destination from among items of the relay apparatus identification information respectively corresponding to the one received item of the terminal identification information for identifying the transmission terminal acting as the request source and the other received item of the terminal identification information for identifying the transmission terminal acting as the destination.

2. The transmission management system as claimed in claim 1, further comprising:
  a relay apparatus management part configured to manage an operating state of the plural relay apparatuses using the items of the relay apparatus identification information for identifying the plural relay apparatuses, respectively, wherein
  the preliminary narrowing down part is configured to narrow down using items of the relay apparatus identification information each having the operating state of on-line.

3. A transmission system which comprises the transmission management system as claimed in claim 1, and further comprises one transmission terminal and another transmission terminal from among the transmission terminal acting as the request source and the transmission terminal acting as the destination, wherein
  the one transmission terminal includes:
  an advance transmission information receiving part configured to receive plural advance transmission information sets each of which sets has been transmitted from the other transmission terminal via a respective one of the two or more relay apparatuses narrowed down by the preliminary narrowing down part and indicates a transmission time of having been transmitted from the other transmission terminal;
  a measurement part configured to measure, for each of the advance transmission information sets, a reception time of being received by the advance transmission information receiving part;
  a calculation part configured to calculate a required time from the transmission to the reception of each of the advance transmission information sets, based on the difference between the measured reception time and the transmission time included in the advance transmission information set; and
  a final selection part configured to finally select the single relay apparatus which has relayed the advance transmission information set having required the shortest required time among the calculated required times, to finally narrow down to the single relay apparatus.

4. A transmission management method using a transmission management system which assists in finally narrowing down to a single relay apparatus from among plural of the relay apparatuses for relaying content data to be transmitted between plural transmission terminals via a communication network, wherein
  the transmission management system comprises a relay possible apparatus management part configured to manage, for items of terminal identification information for identifying the transmission terminals, respectively, relay apparatus identification information for identifying the relay apparatuses, each of which is capable of relaying the content data transmitted from one of the transmission terminals,
  the transmission management system carries out
  receiving, from the transmission terminal acting as a request source, one of the items of the terminal identification information for identifying the transmission terminal acting as the request source and another of the items of the terminal identification information for identifying the transmission terminal acting as a destination;
  narrowing down to two or more of the relay apparatuses before finally narrowing down to the single relay apparatus, by searching the relay possible apparatus management part based on the one received item of the terminal identification information for identifying the transmission terminal acting as the request source and the other received item of the terminal identification information for identifying the transmission terminal acting as the destination, and extracting items of the relay apparatus identification information each being common to the one received item of the terminal identification information for identifying the transmission terminal acting as the request source and the other received item of the terminal identification information for identifying the transmission terminal acting as the destination from among items of relay apparatus identification information respectively corresponding to the one received item of the terminal identification information for identifying the transmission terminal acting as the request source and the other received item of the terminal identification information for identifying the transmission terminal acting as the destination.

5. The transmission management method as claimed in claim 4, wherein the transmission management system further comprises a relay apparatus management part configured to manage an operating state of the plural relay apparatuses using the items of the relay apparatus identification information for identifying the plural relay apparatuses, respectively, and the narrowing down narrows down using the items of the relay apparatus identification information each having the operating state of on-line.

6. A nontransitory computer readable medium storing a transmission management program, which when executed by a computer processor causes the computer processor to perform the transmission management method claimed in claim 4 using the transmission management system.

7. A maintenance system carrying out maintenance of the transmission management system claimed in claim 1.

\* \* \* \* \*